Dec. 15, 1953

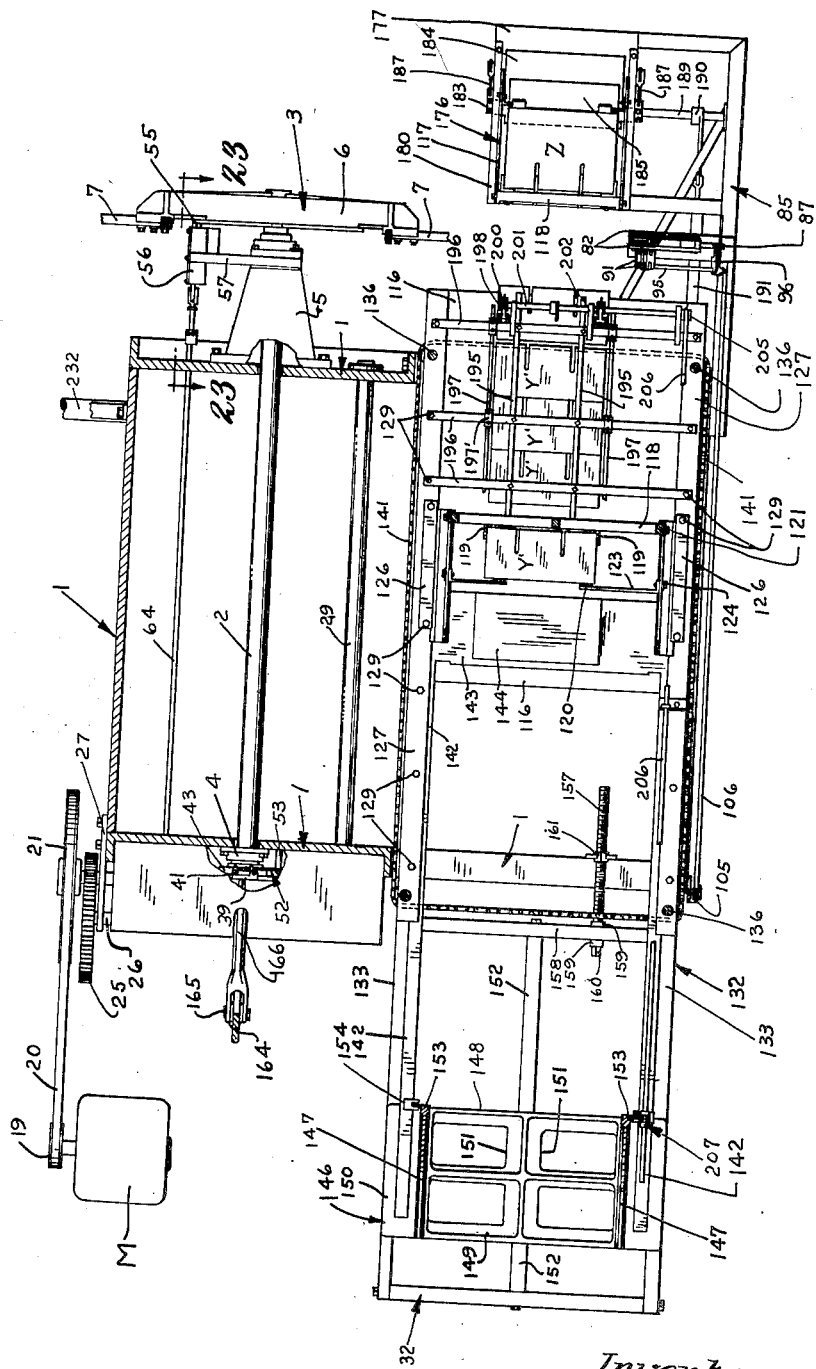

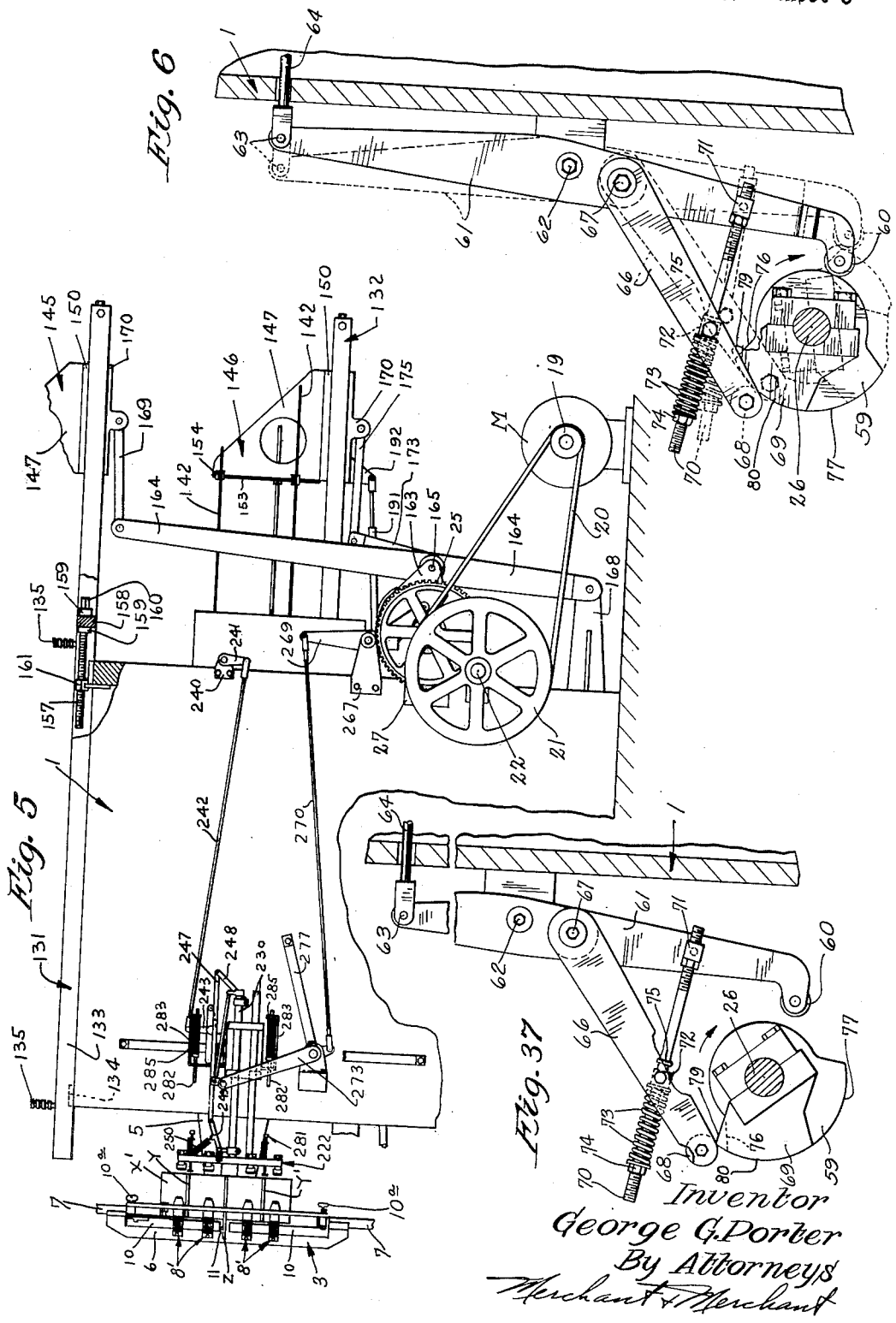

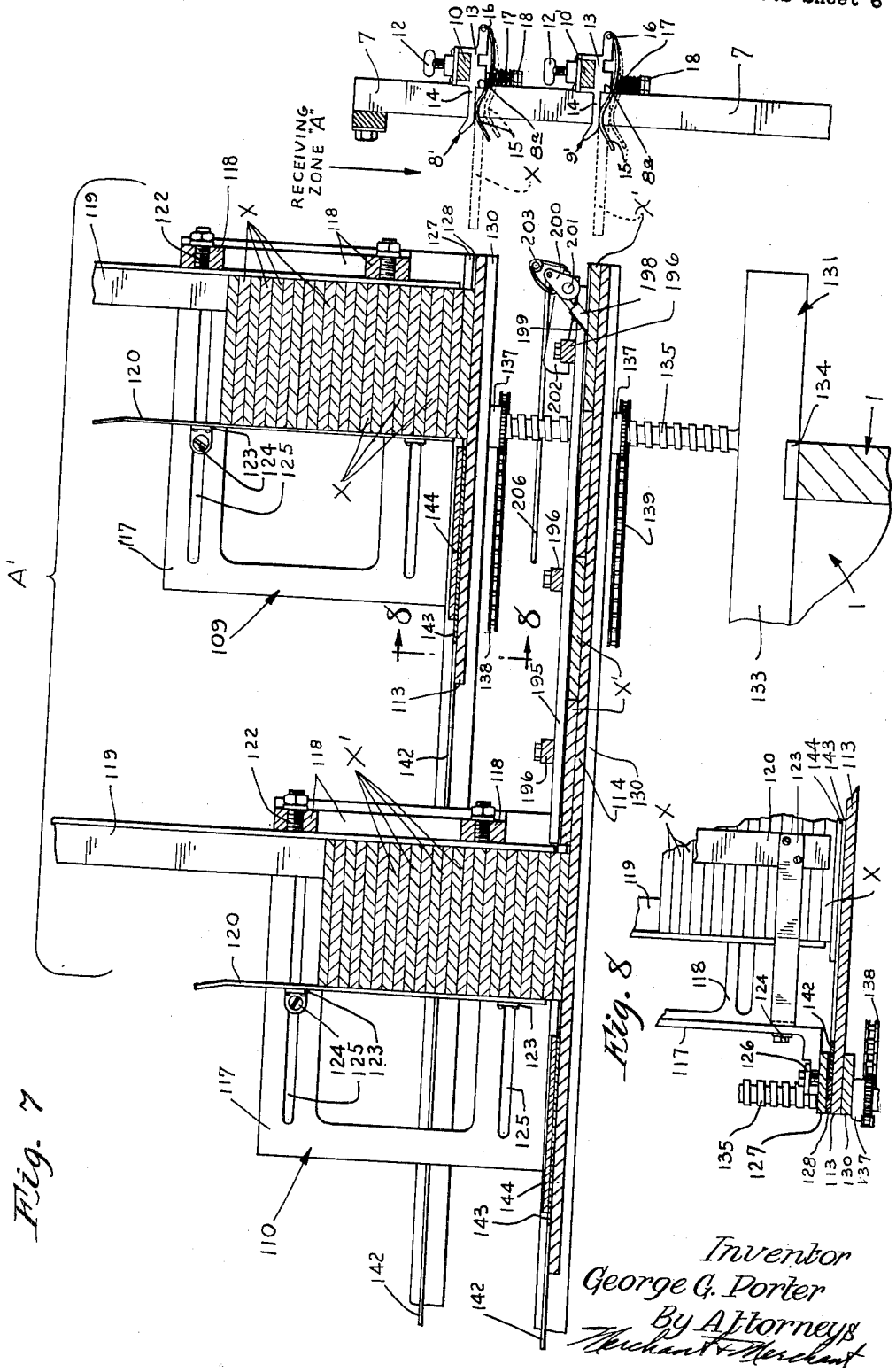

G. G. PORTER 2,662,453

CELL CASE PARTITION ASSEMBLING MACHINE

Filed Oct. 13, 1947

Inventor
George G. Porter
By Attorneys
Merchant & Merchant

Dec. 15, 1953 G. G. PORTER 2,662,453
CELL CASE PARTITION ASSEMBLING MACHINE
Filed Oct. 13, 1947 13 Sheets-Sheet 8
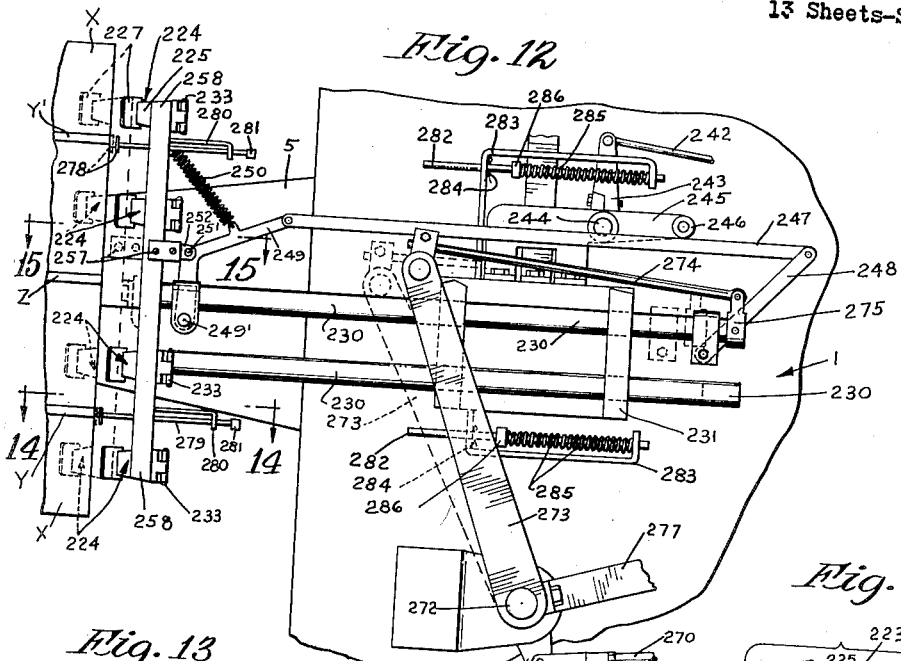
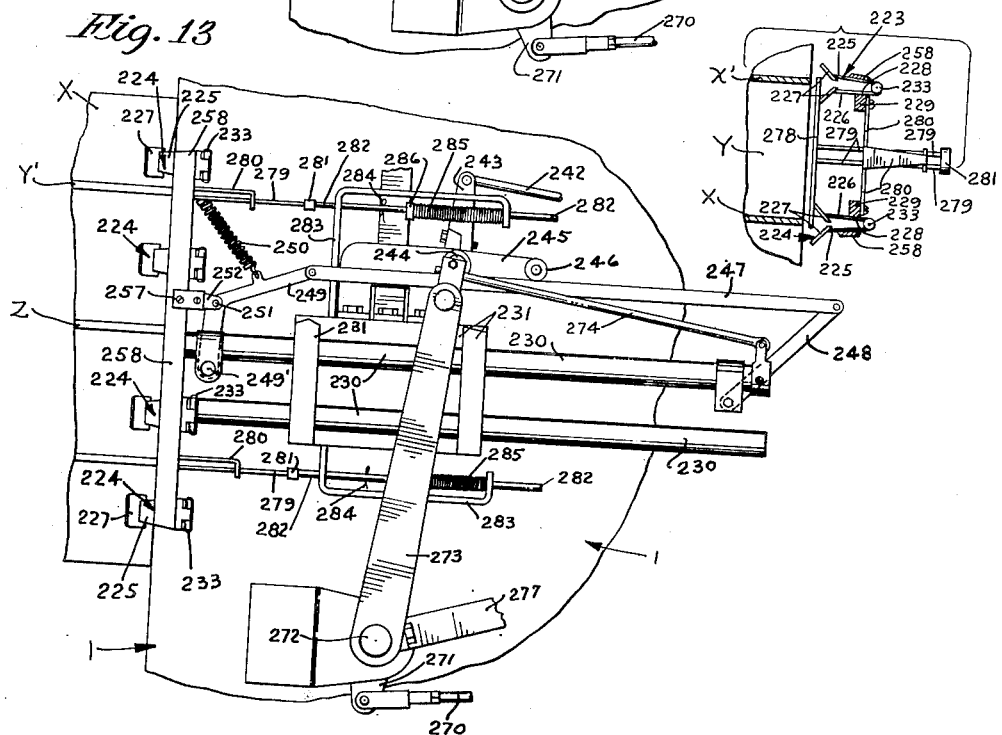
Inventor
George G. Porter
By Attorneys
Merchant & Merchant

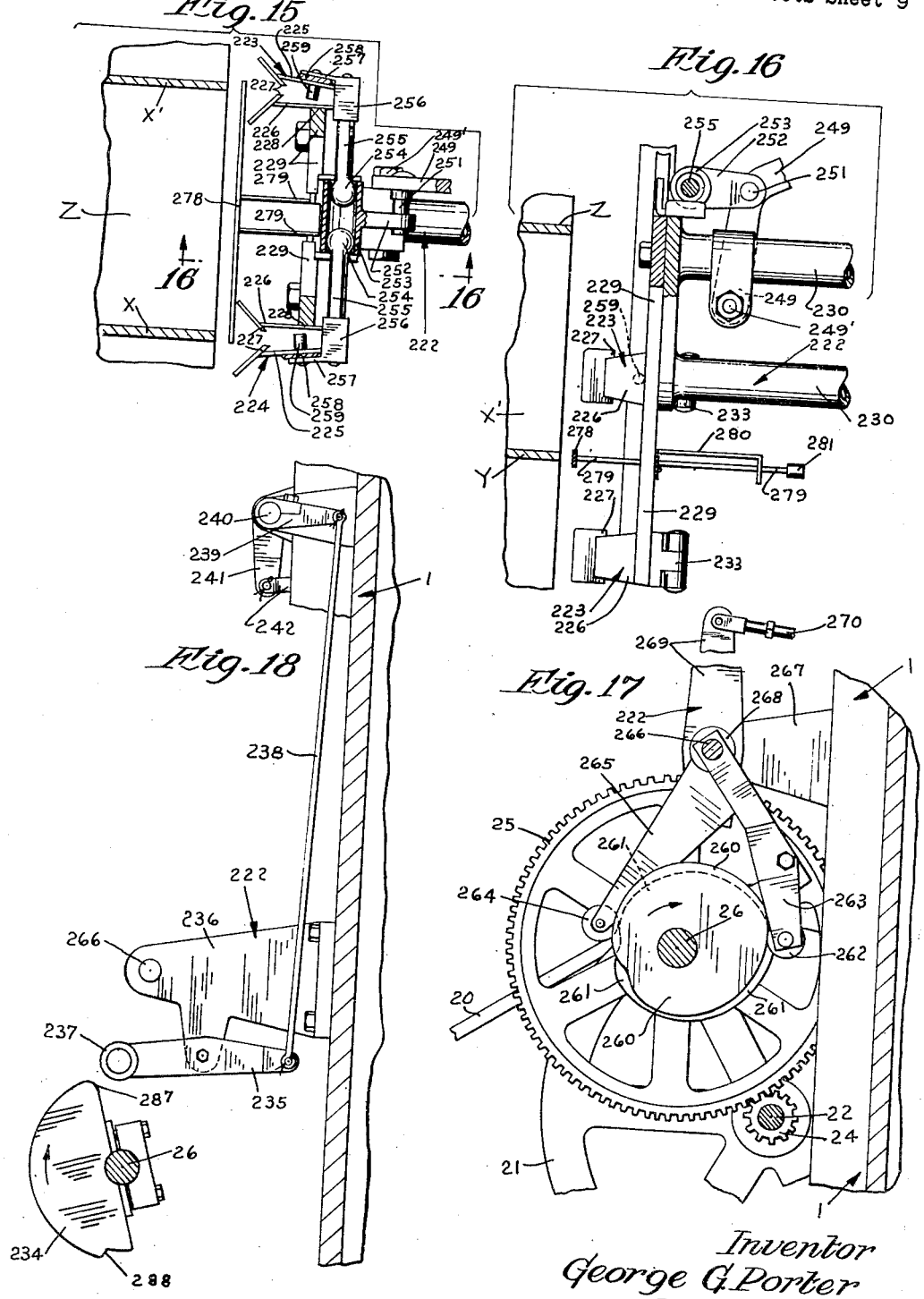

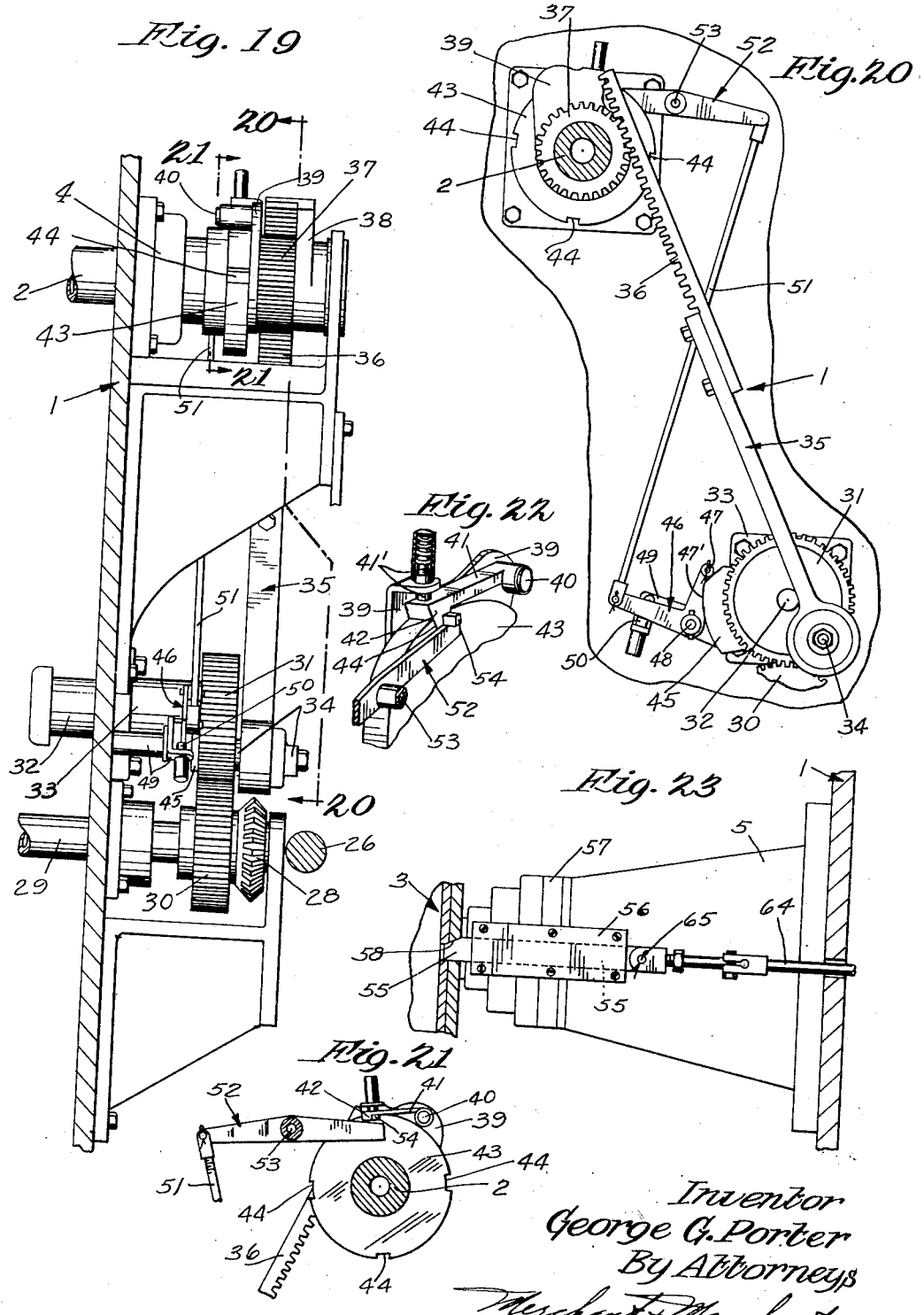

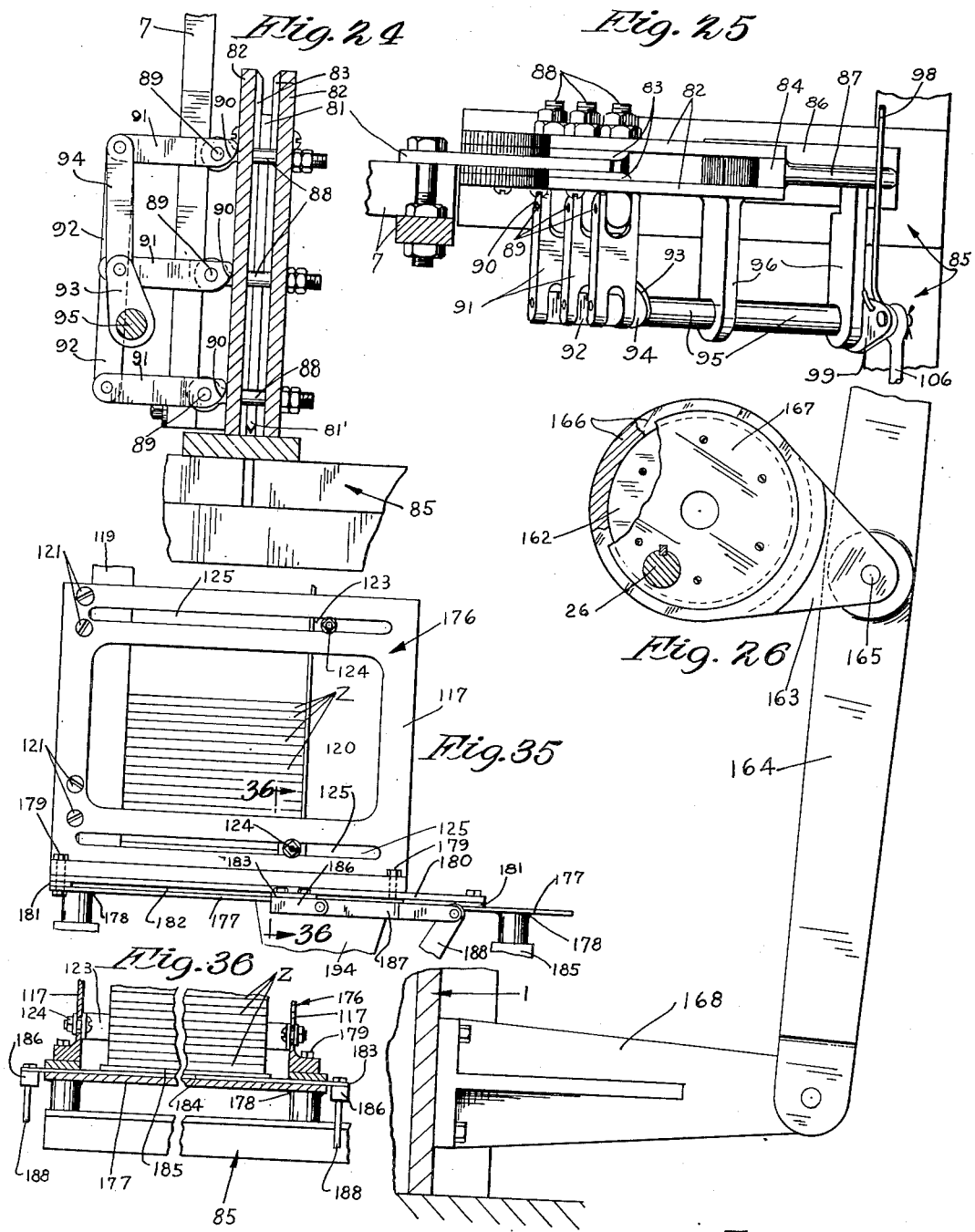
Dec. 15, 1953     G. G. PORTER     2,662,453
CELL CASE PARTITION ASSEMBLING MACHINE
Filed Oct. 13, 1947     13 Sheets-Sheet 11
Inventor
George G. Porter
By Attorneys Dec. 15, 1953     G. G. PORTER     2,662,453
CELL CASE PARTITION ASSEMBLING MACHINE
Filed Oct. 13, 1947     13 Sheets-Sheet 12
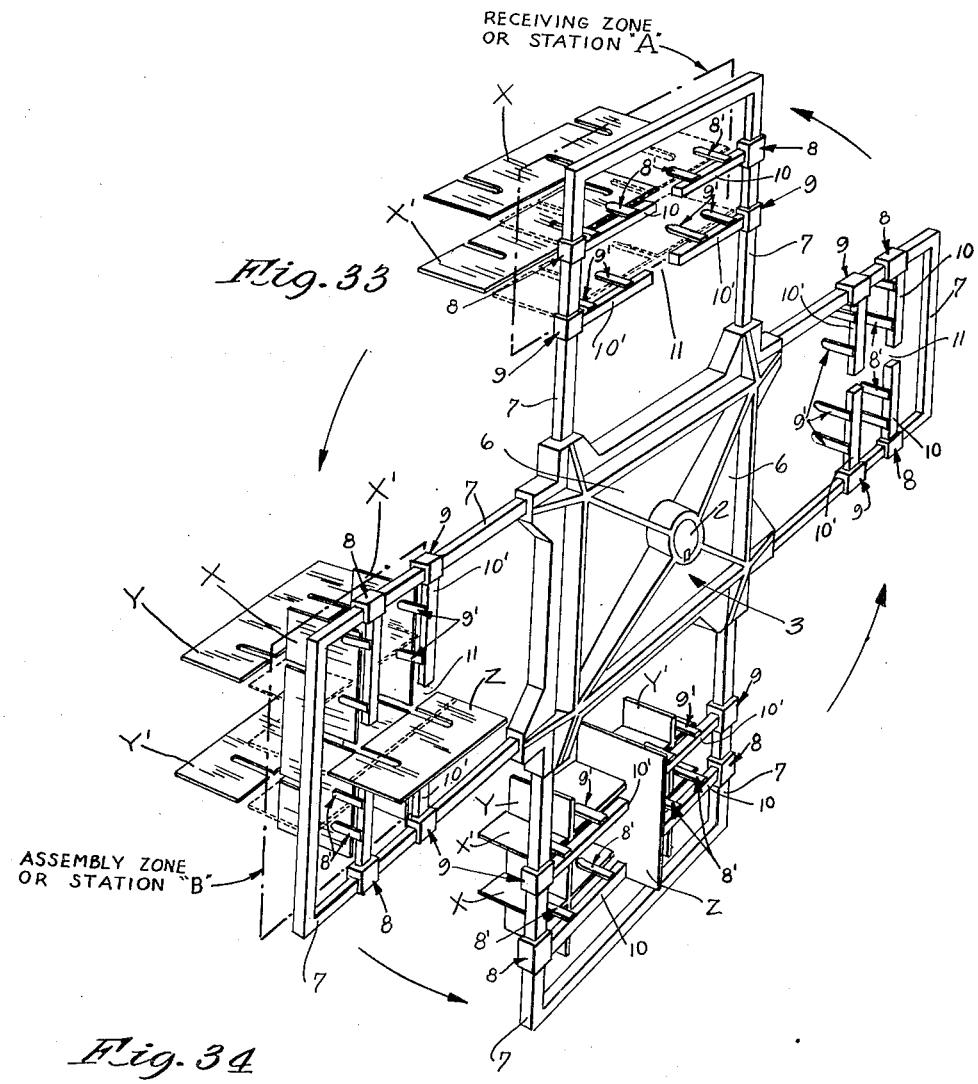
Inventor
George G. Porter
By Attorneys
Merchant & Merchant Dec. 15, 1953  G. G. PORTER  2,662,453
CELL CASE PARTITION ASSEMBLING MACHINE
Filed Oct. 13, 1947                                                                 13 Sheets-Sheet 13
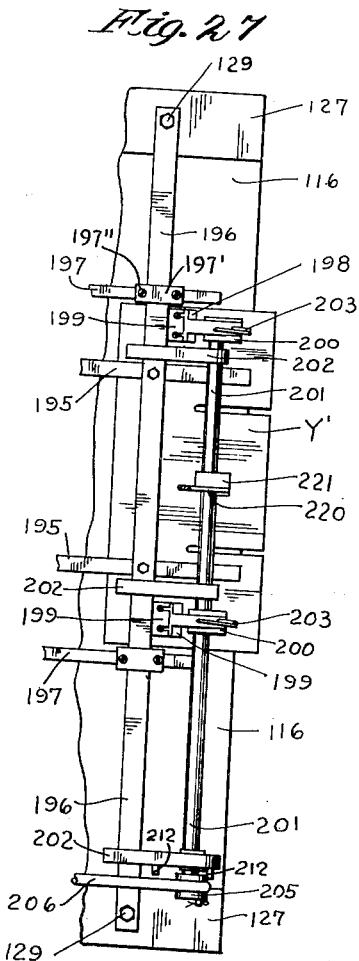
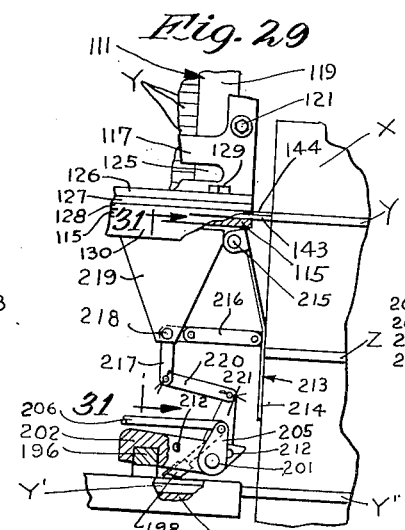
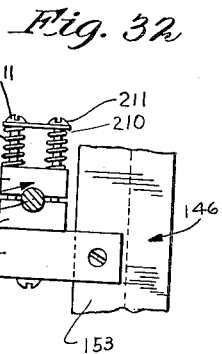
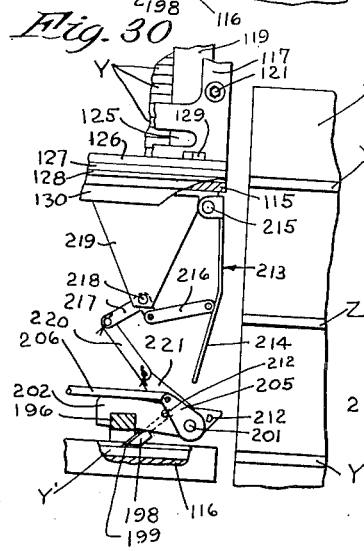
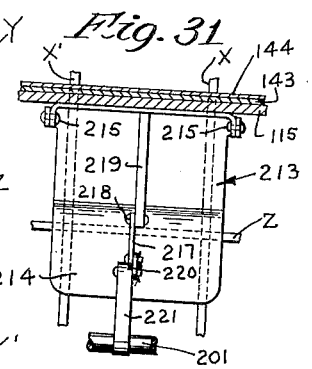
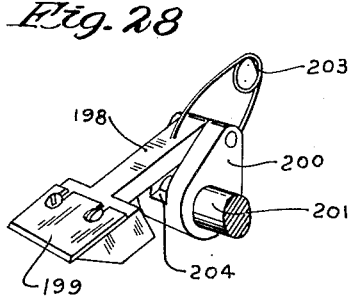
Inventor
George G. Porter
By Attorneys
Merchant & Merchant Patented Dec. 15, 1953

2,662,453

UNITED STATES PATENT OFFICE 2,662,453

CELL CASE PARTITION ASSEMBLING MACHINE

George G. Porter, Miami, Fla.

Application October 13, 1947, Serial No. 779,432

32 Claims. (Cl. 93—37)

My present invention relates to improvements in machines for assembling cell case partitions into crossed assembled relationship to form cell case cores which, when placed in suitable cases or containers, divide the interiors of their respective cases or containers into pluralities of compartments to form completed cell cases. Generally stated, the invention consists of the novel devices, combinations of devices and arrangement of parts hereinafter described and defined.

As is well known, cell cases of the kind referred to are commonly used for packaging a plurality of fragile items requiring isolation from one another to prevent breakage or damage. As is also well recognized, the cores of these so-called cases are customarily formed independently of their respective cases or containers and comprise crossed partition-forming strips. The partition-forming strips of these cell case cores are customarily cut from suitable sheet material, such as cardboard or corrugated board, and the crossing or intersecting partitions are notched, slotted or slit at each line of intersection with another partition to receive the intersecting partition to approximately one-half the depth thereof, so that in the completed core, all of the partitions are interlocked to form compartments or cubicles of predetermined dimensions.

The number of partitions involved in any single cell case core, as well as the sizes and shapes of the individual partitions and the spacing between adjacent parallel partitions varies widely according to the number, size and shape of the individual compartments desired.

In considering machines for automatically assembling these cell case partition cores, the great variation in size, shape and cellular structures of cell case cores required for packaging of different sizes, kinds and numbers of items in a common case is a very important factor, and this particularly in view of the fact that in many instances cell case cores having several different specifications are often assembled in a single plant which could not profitably employ a specialized machine for assembling cell case cores of each different specification.

It is, therefore, an important objective of the instant invention to provide a cell case partition assembling machine incorporating novel features whereby a single machine can be readily adjusted to accommodate and handle partitions for cell case cores of widely varying specifications. This broad objective is not in itself entirely original with me since some earlier workers in the art designed their machines with a view of providing adjustability to take care of at least some of the variations noted above, but the fact remains that all such machines which have hitherto been designed with a view of versatility of adaptation have proven objectionable for one reason or another, and for the most part, at least, have been largely or wholly abandoned insofar as commercial application is concerned. This does not mean that there are not some automatic machines in use for commercially assembling cell case partitions to form completed cell case cores, but investigation indicates that these are largely or wholly specialized machines built and used to assemble cell case cores of standard or uniform specifications and are, therefore, commercially feasible in only those plants where the volume requirement for cell case cores of such uniform specification are very high. That the field where such specialized machines are commercially feasible is very limited is indicated by the fact that the vast majority of cell case cores are even today assembled by hand, and this in the face of high cost of production by hand and a severe labor shortage which often produces serious delays in production.

In accordance with the present invention, cell case partition assembling machines may be constructed having a wide range of adjustments for partition lengths, depths, numbers and spacing, thereby rendering the machines highly versatile and capable of adaptability to the assembling of cell case cores of widely varying specifications. Hence, machines built in accordance with the present invention are commercially feasible and, in fact, highly practical in plants of all sizes and including those which assemble relatively small quantities of cell case partition cores of each of several different specifications.

Another important objective of the invention is the provision of an improved cell case partition assembling machine having greater capacity or hourly output than has hitherto been customary with machines of this general character.

Other important objectives of the invention are rugged construction, dependable, positive action, and simplicity of control.

The above and highly important objects and advantages of the invention will be made apparent and further emphasized in the accompanying specification, claims and appended drawings.

In the accompanying drawings, like characters indicate like parts throughout the several views.

Referring now to the drawings which illustrate one embodiment of the invention.

Fig. 4 is a detail horizontal sectional view taken on the irregular line 4—4 of Fig. 1;

Fig. 5 is a fragmentary view in side elevation of the side of the machine opposite to that shown in Fig. 1;

Fig. 6 is an enlarged fragmentary sectional view taken on the line 6—6 of Fig. 3 and showing details of the operating mechanism for the turret indexing plunger;

Fig. 7 is an enlarged fragmentary sectional view taken on the line 7—7 of Fig. 2 and showing details of the turret and the partition dispensing mechanism;

Fig. 8 is a similarly enlarged fragmentary sectional view taken on the line 8—8 of Fig. 7 and showing further details of the table and magazine portions of one partition dispenser;

Fig. 11 is an enlarged detailed view section taken on the line 11—11 of Fig. 1 and showing details of the conveyor mechanism of one dispenser;

Fig. 12 is a fragmentary view in side elevation corresponding to part of Fig. 5 and showing, on an enlarged scale, parts of the mechanism for disposing of assembled partition units;

Fig. 13 is a view corresponding to Fig. 12 but showing different positions of certain of the parts;

Fig. 14 is a detail sectional view taken on the line 14—14 of Fig. 12;

Fig. 15 is a fragmentary sectional view taken on the line 15—15 of Fig. 12, but showing the parts on a further enlarged scale;

Fig. 16 is a fragmentary sectional view taken on the line 16—16 of Fig. 15;

Fig. 17 is an enlarged fragmentary sectional view taken on the line 17—17 of Fig. 3 and showing, in particular, other parts of the mechanism for finally disposing of the assembled partition units;

Fig. 18 is an enlarged fragmentary sectional view taken on the line 18—18 of Fig. 3 and showing other parts of the mechanism for disposing of completed partition assemblies;

Fig. 19 is an enlarged fragmentary sectional view taken on the line 19—19 of Fig. 3 and showing details of the turret opening mechanism;

Fig. 20 is a fragmentary sectional view taken on the line 20—20 of Fig. 19;

Fig. 21 is a fragmentary sectional view taken on the line 21—21 of Fig. 19;

Fig. 22 is a fragmentary perspective view of the parts shown in Fig. 21;

Fig. 23 is an enlarged sectional view taken on the line 23—23 of Fig. 4, shown as though viewed from top toward the bottom with respect to Fig. 4 and illustrating details of the turret indexing mechanism;

Fig. 24 is an enlarged fragmentary sectional view taken on the line 24—24 of Fig. 9 and illustrating further details of the turret brake;

Fig. 25 is an enlarged detail sectional view taken on the horizontal line 25—25 of Fig. 9 and showing still further details of the turret brake;

Fig. 26 is an enlarged fragmentary sectional view taken on the line 26—26 of Fig. 3 and showing details of the drive for the dispensing mechanism;

Fig. 27 is a fragmentary view showing a portion of Fig. 4 on a greatly enlarged scale, said view being also taken on the line 4—4 of Fig. 1 and showing, in particular, details of the partition delivery train retracting mechanism of a dispenser;

Fig. 28 is an enlarged detail perspective view, with some parts broken away, of a crank-operated, pawl-actuating, partition train retracting finger, shown in plan in Fig. 27;

Fig. 29 is an enlarged fragmentary view in side elevation, with some parts broken away, further illustrating portions of the partition retracting mechanism and also illustrating portions of the mechanism for locking partitions in the turret holders;

Fig. 30 is a detail view corresponding to Fig. 29 but showing somewhat different positions of certain of the parts;

Fig. 31 is a fragmentary sectional view taken on the line 31—31 of Fig. 29;

Fig. 32 is an enlarged fragmentary detail sectional view taken on the line 32—32 of Fig. 1 of a friction drive device for the partition retracting and partition locking mechanisms;

Fig. 33 is a diagrammatic perspective view of the partition holder-equipped turret type conveyor of the machine and further illustrating schematically certain of the operations of the machine;

Fig. 34 is a top perspective view of a completely assembled cell case core;

Fig. 35 is a fragmentary view in side elevation showing on an enlarged scale a magazine portion of one of the dispensers;

Fig. 36 is a detail sectional view taken on the line 36—36 of Fig. 35; and

Fig. 37 is a fragmentary sectional view corresponding to Fig. 6 but showing a different position of some of the parts.

Turret

Figure 2:
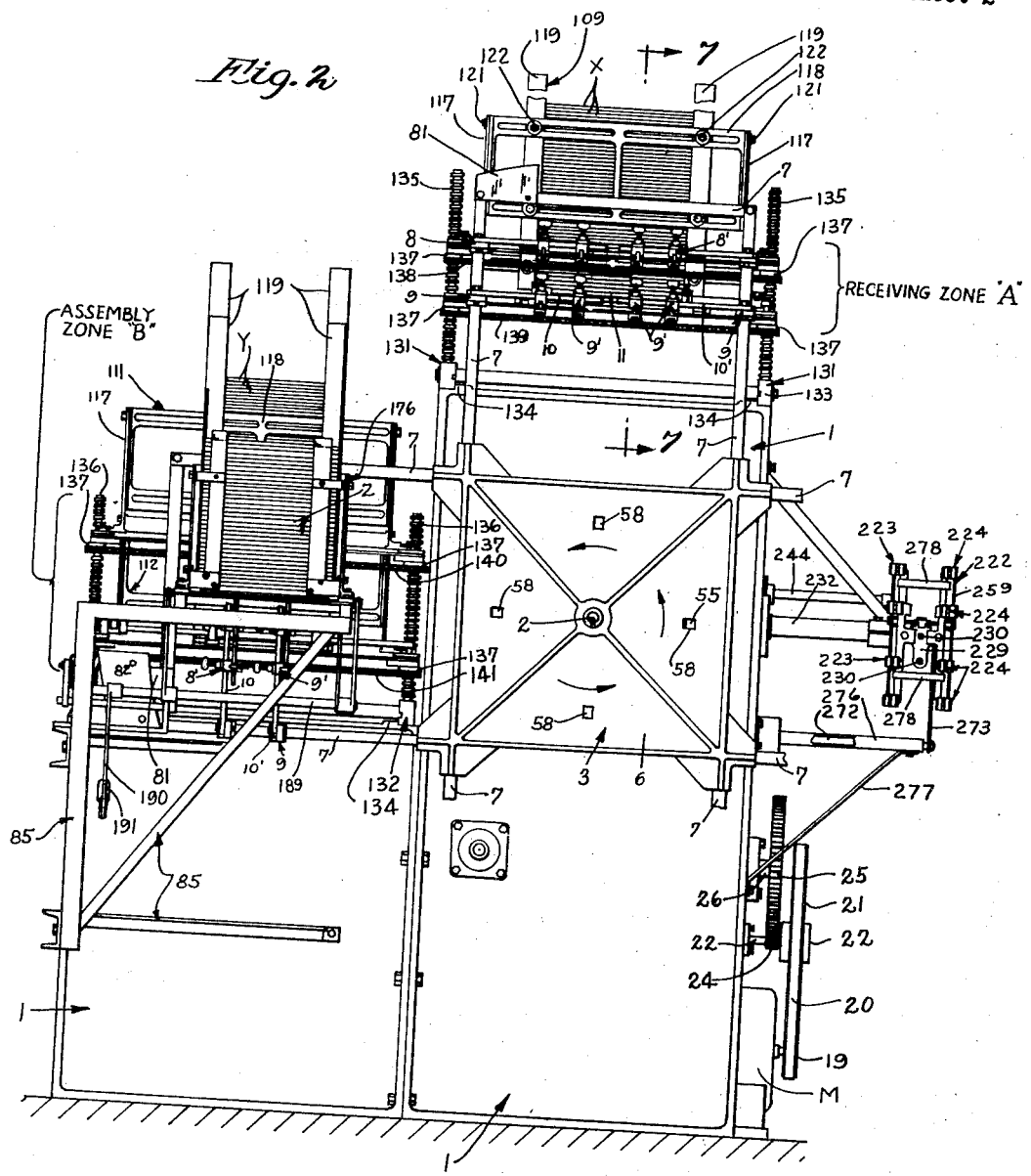
Fig. 2 is a view in front elevation of the machine of Fig. 1.

In the drawings, the main or base frame structure of the machine is indicated as an entirety by 1. Extending through the front and rear plates of the base frame structure is a shaft 2 having mounted fast on its projecting front end a turret-type conveyor, which latter is indicated as an entirety by 3. The shaft 2 is journalled at its rear end in a frame supported bearing 4 and at its front end in a forwardly projecting bearing boss 5. In the particular embodiment of the invention herein illustrated, the turret-type conveyor 3 comprises a generally rectangular hub-acting portion 6 having a plurality of radially projecting arms 7 of which there are four spaced 90 degrees apart. In accordance with the present illustration, the arms 7 are U-shaped (see particularly Figs. 2 and 33).

Turret partition holders

By reference now particularly to Figs. 1, 2, 7 and 33, it will be seen that each of the turret arms 7 is provided with holders for a group of spaced cell case partitions, there being, in the embodiment of the invention illustrated, holders for two cell case partitions on each of the arms 7 of the turret conveyor 3 (see particularly Fig. 33).

In the form of the invention illustrated, the partition holders are of the spring friction type, and the holder for each partition comprises a set of four spring clips, the spring clips of the set comprising the radially outermost holder of each arm 7 being collectively indicated by 8 and being individually indicated by 8', and the spring clips of the set comprising the radially innermost holder of each arm 7 being collectively indicated by 9 and being individually indicated by 9'.

Figures 9, 10:
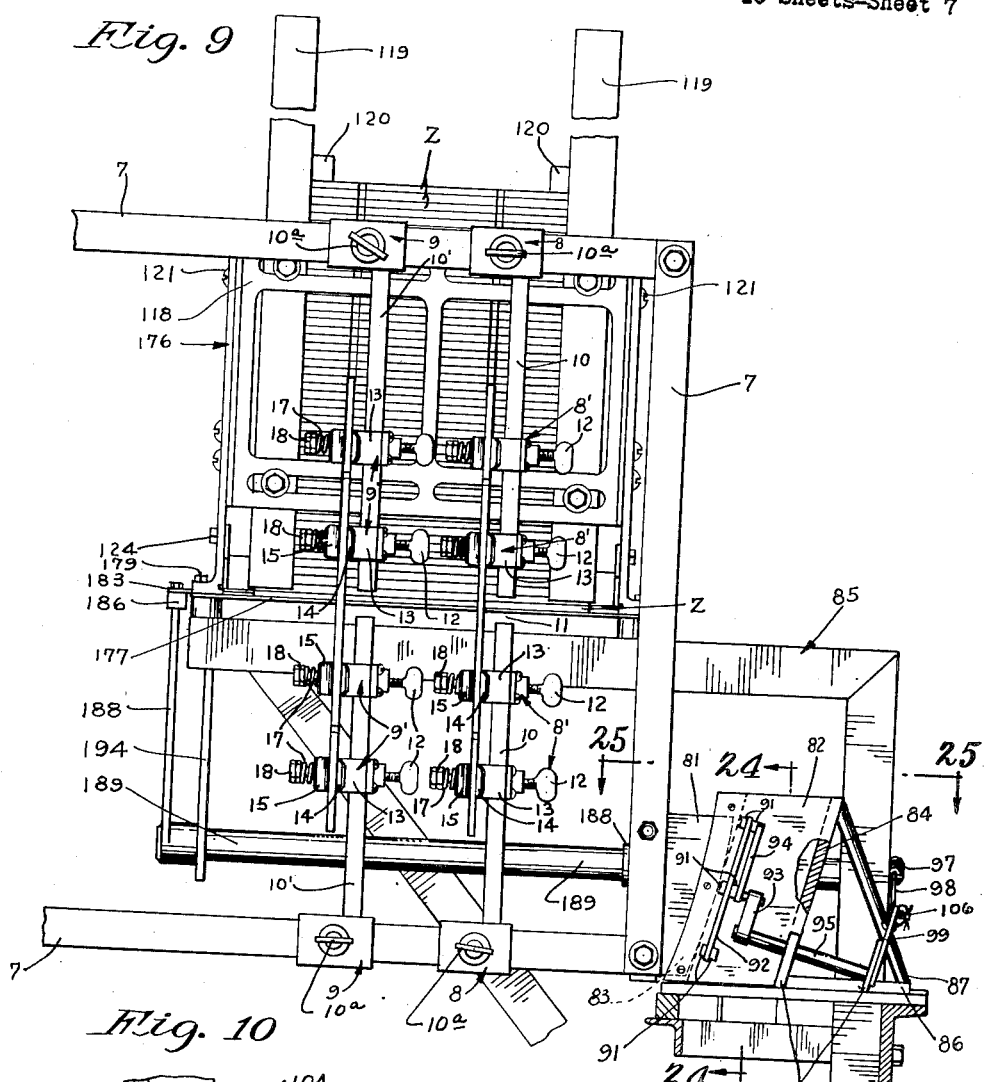
Fig. 9 is an enlarged fragmentary view, with some parts broken away, taken on the line 9—9 of Fig. 1 and showing details of the turret and turret brake.
Fig. 10 is a similarly enlarged detail sectional view taken on the line 10—10 of Fig. 3 and showing details of the turret brake releasing mechanism.

As an important feature of the present invention, the individual spring clips 8' and 9' of the holders 8 and 9, respectively, are mounted for adjusting movements toward and from one another to vary the overall span thereof and the spacing therebetween to accommodate partitions of various lengths and slot spacings. In the embodiment of the invention illustrated, this is accomplished by slidably mounting the clips 8' of the holders 8 of each turret conveyor arm on an arm mounted bar 10 and by similarly mounting the spring clips 9' of the holder 9 of each turret conveyor arm for sliding movements on a corresponding arm mounted bar 10'. For purpose hereinafter made apparent, the mounting bars 10 and 10' are divided at their centers to provide passages 11 therethrough axially of the turret conveyor (see particularly Fig. 33). The spring clips 8' and 9' are locked in desired adjusted positions on their respective divided bars 10 and 10' by suitable thumb set screws 12 (see Figs. 7 and 9). As a further and very important feature of the invention, opposite sections of the divided spring clip carrying bars 10 and 10' are adjustably slidably mounted on opposite radial portions of the turret arms 7 and are held in suitably spaced adjusted positions by thumb set screws 10a (see Figs. 1 and 9).

By reference now particularly to Fig. 7, it will be seen that each of the spring clips 8' and 9' comprises a rigid body 13 adjustably slidably mounted on the mounting bars 10 and 10', respectively, of the turret arms 7 for adjusting movements thereon to vary the spacing between the several cooperating clips 8' and 9' for the purpose of accommodating cell case partitions having different dimensions and slot spacings. The spring clips 8' and 9' are locked in desired adjusted positions by thumb set screws 12 threaded into bodies 13 and engaging the mounting bars 10 or 10' of the arms 7. The rigid body 13 of each spring clip 8' and 9' is provided with a rigid rearwardly projecting partition engaging finger 14 which cooperates with a spring finger 15 pivoted to the forward end of the rigid body at 16 and yieldingly pressed into engagement with the cooperating rigid finger 14 by a coil compression spring 17. The coil compression springs 17 are mounted on the intermediate portions of adjusting nut-equipped bolts 18. The bolts 18 are anchored fast at their inner ends in the bodies 13 and work loosely through their cooperating spring fingers 15. The inner ends of cooperating fingers 14 and 15 of the clips 8' and 9' are flared for reception of cell case partitions fed edgewise thereto. The turret conveyor 3 is intermittently driven in a counter-clockwise direction with respect to Figs. 2 and 33 to bring the same successively into four different indexed positions spaced 90 degrees apart. In each of these four indexed positions of the turret, a different turret carried group of partition holders 8 and 9 will be brought to a receiving zone or station A (see particularly Fig. 33), and another group of turret mounted partition holders 8 and 9, spaced 90 degrees from the first said group thereof in a counter-clockwise direction, will be brought to an assembly zone or station B (see particularly Fig. 33). As an aid in locating these so-called zones or stations on the drawings, the receiving zone or station is boxed in by broken lines A in Fig. 33 and the assembly zone or station is boxed in by broken lines B in Fig. 33.

*Turret drive*

Figure 3:
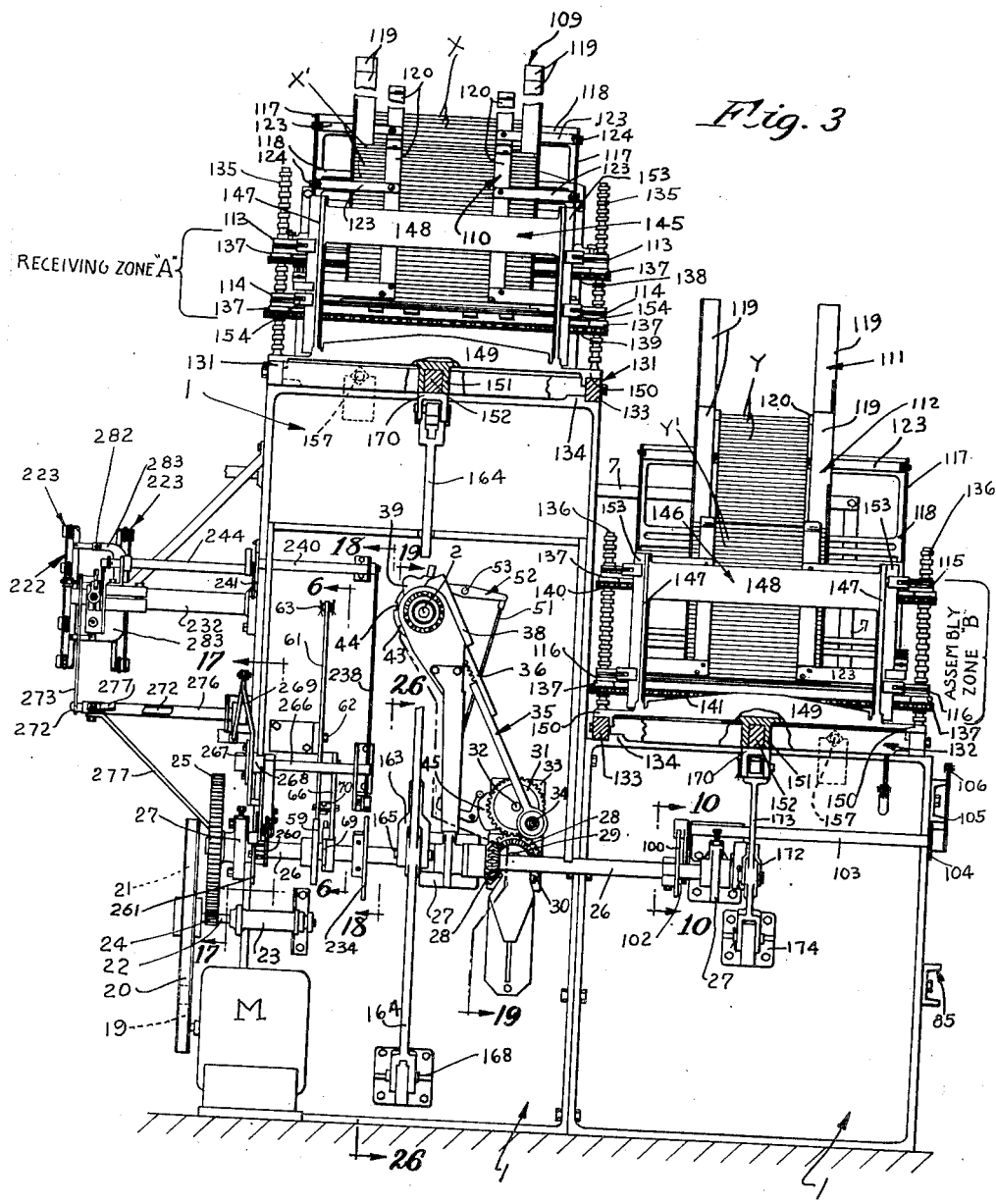
Fig. 3 is a view in rear elevation of the machine of Figs. 1 and 2.

The turret-type conveyor 3 is intermittently rotated in the manner just above described from a suitable source of power such as an electric motor M through power transmission and control mechanism as follows: Mounted fast on the shaft of the motor M is a pulley 19 which drives a belt 20 running over and driving a large speed-reducing pulley 21 mounted fast on a shaft 22 journalled to the base frame structure 1 in a bearing 23. Mounted fast on the shaft 22 is a pinion gear 24 that intermeshes with a large speed-reducing gear 25 mounted fast on one end of a long power take-off shaft 26 journalled in bearings 27 on the rear of the base frame 1. At this point attention is called to the fact that the motor M and transmission connections therefrom thus far described are common to all of the power driven elements of the machine, several of which have not thus far been specifically referred to. The power transmission connections to the conveyor further comprise a pair of intermeshing bevelled gears 28, one of which is mounted fast on the shaft 26 and the other of which is mounted fast on the projecting rear end of a forwardly and rearwardly extending shaft 29 that extends through the front and rear plates of the base frame 1 and is journalled adjacent its opposed ends in said front and rear plates. Also mounted fast on the rearwardly projecting end of the shaft 29 is a spur gear 30 that intermeshes with and drives a similar spur gear 31, which latter is mounted fast on the projected rear end of a stub shaft 32 that is journalled in a bearing 33 fast on the rear plate of the base frame 1. The spur gear 31 carries a crank pin 34 on which is journalled the lower end of a pitman arm 35. The pitman arm 35 is shown as being a composite structure made up of lower and upper sections and the said upper section thereof is toothed to provide a gear rack 36. This gear rack section 36 of the pitman arm 35 intermeshes with and drives a spur gear 37 loose on the rearwardly projecting end of the turret shaft 2. The rack section 36 of the pitman arm 35 is maintained in proper intermeshing relationship with the gear 37 by an oscillating guide 38 (see Figs. 3 and 19) journalled on the shaft 2. The gear 37 is continuously oscillated by the rack tooth-equipped pitman arm and, since the turret 3 and its shaft 2 are to be intermittently but unidirectionally driven, mechanism is provided for coupling the oscillating gear 37 to the shaft 2 intermittently and only under movements of the pitman arm in one direction. This mechanism comprises a plate 39 fast on the gear 37 (see particularly Figs. 19, 20 and 21), a pin 40 mounted fast on the plate 39, a latch arm 41 pivoted at one end on the pin 40 and having at its free end a latch dog 42, and a circular flange 43 fast on the turret shaft 2 and having four equally spaced peripheral notches 44 for alternate reception of the latch dog 42. The latch dog-equipped arm 41 is yieldingly biased in the direction of the notched flange 43 by a spring pressed plunger 41' (see particularly Fig. 22).

The said driving connections 39 to 44, inclusive, are automatically controlled by mechanism as follows: A cam 45 is mounted fast on shaft 32 adjacent gear 31 and operates a bell crank 46 by engagement with a roller 47 on one end thereof. The bell crank 46 is intermediately pivoted at 48 on a frame mounted bracket 49 (see Figs. 19 and 20). The bell crank 46 is yieldingly biased to move its free roller-equipped end 47 into the path of the cam 45 by a spring pressed plunger 50. The other end of the bell crank 46 is pivotally connected to a connecting rod 51, which, in turn, is pivotally connected at its upper end to one end of a lever 52. The lever 52 is intermediately pivoted at 53 to the rear plate of the base frame 1. The free end of the lever 52 projects beneath and engages the underside of a lug 54 fast on and projecting from the latch dog 42.

It will now be seen that when the motor M is in operation, the gear 37 will be continuously oscillated by the reciprocating rack teeth equipped pitman arm. Because the turret is to be intermittently driven in steps of 90 degrees each, the throw of the crank pin 34 operating the rack 36 will be just sufficient to impart 90 degrees of rotary movement to the gear 37 in each direction. In each of the four indexed positions of the turret, the latch dog 42 of arm 41, which oscillates in common with the gear 37, will drop into a different one of the four peripheral notches 44 of the shaft mounted flange 43. Under rotary movements of the gear 37, plate 39, and latch arm 41, the latch lug 42 of said arm 41 will remain seated in a peripheral notch 44 of the flange 43, and will lock said flange to the plate 39 and gear 37, thereby causing the turret shaft 2 and turret 3 to partake of common rotary movement with the gear 37 and plate 39 through 90 degrees in a clockwise direction with respect to Fig. 20. The turret, having now been given a step of rotation to the new station, the latch arm 41 will be raised against the yielding action of the spring pressed plunger 41' to release its latch dog 42 from an engaged notch 44 in flange 43 by engagement of cam 45 with the roller equipped end 47 of the bell crank 46 which, operating through the push rod 51, will rock the lever 52 in a clockwise direction with respect to Fig. 20, thereby raising the free end of said arm against the underside of the latch dog carried lug 54 and raising said latch dog sufficiently to release it from the engaged flange notch 44. Of course, upon releasing of the latch dog 42 from the engaged notch 44, the gear 37 will again be free of the shaft mounted flange 43; and the gear 37, plate 39 and latch arm 41 will be free to rotate in the opposite direction independently of the shaft 2 and its flange 43 until the latch dog 42 falls into another peripheral notch 44 of the flange 43 preparatory to imparting another step of movement to the shaft 2 and the turret 3. At this point attention is called to the fact that Figs. 20, 21 and 22 show the various parts of the turret driving connections from the shaft 32 in the positions which they assume immediately prior to the releasing of latch dog 42 from a cooperating flange notch 44. In this position of the parts, the crank pin 34 is just a few degrees from bottom dead center on its downward turret operating stroke, and the cam following roller 47 has just come into engagement with the toe 47' of the cam 45 to initiate the withdrawal of the latch lug 42 from an engaged notch 44 of flange 43. In the arrangement illustrated, the cam 45 completes the withdrawal of the turret driving latch lug 42 from a cooperating notch 44 during the few degrees of downward movement of the crank pin 34 from the position shown in Fig. 20 to bottom dead center position.

*Turret indexing*

To positively stop the turret 2 at each of its four indexed positions, to which it is power driven by the oscillating latch arm 41, there is provided indexing mechanism comprising an index plunger 55 slidably mounted in a bearing box 56 on the forwardly projecting bearing boss 5 by means of a bracket 57 (see Figs. 4 and 23) for the turret shaft 2. The bearing box 56 for the index plunger is located directly behind the hub portion of the turret 3 and is mounted on the bearing boss 5 through a medium of a bracket 57. For reception of the free end portion of the indexing plunger 55, the hub portion of the turret 3 is provided with four indexing apertures 58 that are circumferentially spaced 90 degrees apart. Of course the purpose of the indexing plunger 55 is to positively lock the turret against rotation for intervals between successive rotary step movements of 90 degrees each. To operate the indexing plunger 55 in proper timed relation to driven movements of the turret from one indexing motion to the next, I provide the following operating mechanism from the shaft 26, to wit: A cam 59 is mounted fast on the shaft 26 and cooperates with a cam following roller 60 on the free end of a rocker arm 61 that intermediately is pivoted to the base frame structure 1 at 62 and is pivoted at its upper end at 63 to a connecting rod 64, the other end of which is pivoted at 65 to the rear end of the indexing plunger 55. An arm 66 is pivotally mounted on the rocker arm 61 at a point 67 intermediate the pivot point 62 and the free roller-equipped end of said rocker arm 61. The free end of this arm 66 is provided with a cam following roller 68 for cooperation with a cam 69 mounted on the shaft 26 adjacent the cam 59. Extending between and connecting the intermediate portion of the arm 66 with that portion of the rocker arm 61 intermediate the pivot point 67 and its roller equipped free end is a rod 70. The rod 70 is screw threaded in a block 71 pivoted on the rocker arm 61 and works slidably through a similar block 72 pivoted on the arm 66. Mounted on the rearwardly projecting free end portion of the rod 70 is a coil compression spring 73 that is compressed between the block 72 and a pressure adjusting nut 74 threaded on the rod 70. The spring 73 maintains the rod 70 under yielding pressure to slide rearwardly through the pivoted block 72, but such rearward sliding movement of the rod 70 is definitely limited by a stop shoulder 75 on the rod 70.

The operation of the index plunger and its operating mechanism just above described is as follows: When the turret is in any one of its four indexing positions, the indexing plunger 55 will be seated in an indexing aperture 58 of the turret representing that particular indexing position (see Fig. 23), and in which position the turret will be positively locked against rotation. This then will be the position of the indexing plunger 55 during inoperative upward movements of the rack equipped pitman arm 35 and counter-clockwise movements of the gear 37 when viewed from the rear as in Fig. 20. When the dog 42 of latch 41, which latter partakes of common movements with the gear 37, reaches the extremes of its non-operating counter-clockwise movements with respect to Fig. 20, and the latch dog drops into a cooperating notch 44 of flange 43 preparatory to its clockwise operative movements with respect to Fig. 20, the roller 60 of rock arm 61 will be engaged by the toe 76 of the cam 59 and the said rock arm 61 will be rocked in a counterclockwise direction with respect to Figs. 6 and 37 sufficiently to retract the indexing plunger from the turret apertures 58, then engaged, thereby unlocking the turret prior to each clockwise driving movement thereof.

Upon leaving the toe 76 of the cam 59, the roller 60 will ride on the concentric face 77 of the cam during the initial portion of the step of turret movement then taking place and during this interval the indexing plunger 55 will be maintained out of engagement with the rear face of the turret. Before the turret has completed its step of movement, the roller 60 will ride off of the concentric face 77 of cam 59 and, for a slight continued movement of the turret, the rock arm 61 will remain in exactly the position occupied thereby while the roller 60 thereof was on the concentric face of the cam. While the turret is still partaking of the step of movement in progress, the roller 68 of arm 66 will be engaged by the toe 79 of the cam 69 and will ride onto the concentric face 80 of said cam 69. Under initial lifting movements of the roller 68 over the toe 79 of the cam 69 the arms 66 and 61 will be rocked as a unit on the pivot 62 to the extent necessary and will advance the indexing plunger 55 into engagement with the smooth rear face of the turret. After the indexing plunger 55 engages the smooth rear face of the turret, the balance of the lifting movement imparted by the toe 79 of the cam 69 to the roller 68 of the arm 66 will be utilized to move the arm 66 pivotally with respect to the arm 61 in a clockwise direction with respect to Figs. 6 and 37, thereby sliding the pivoted block 72 of the arm 66 rearwardly on the rod 70 away from its cooperating stop shoulder 75 and against the yielding compression of spring 73. As the cam following roller 68 is now riding on the concentric face 80 of the cam 69, the full yielding force of the compression spring 73 will be exerted on the rear face of the turret 3 through the indexing plunger 55 during the balance of the arcuate step of turret movement now in progress. As soon as the turret 3 reaches a new station at the completion of an arcuate step of movement from a previous station, the indexing plunger 55, being thence still spring pressed against the back face of the turret, will come into registration with and will be forced into an indexing aperture 58 representing the new turret station. This advancing of the indexing plunger 55 into a new indexing aperture 58 will be the result of a clockwise pivotal movement of rock arm 61 on pivot 62, which will move the roller 60 thereof from the position of Fig. 37 back to the position of Fig. 6 where it will remain until next engaged by its cooperating cam toe 76. During part of the period that the turret is thus locked against movement by the indexing plunger 55 the cam following roller 60 will continue to ride along the concentric face of cam 59 but will ride free of the concentric face of the cam 69 before the cam following roller 60 is again engaged by the toe 76 of the cam 59. At this point it is important to note that the indexing plunger 55 becomes aligned with and is projected into a cooperating indexing recess 58 when the turret operating parts from shaft 32 are positioned as in Figs. 20, 21 and 22, by reference to the former of which it will be noted that the crank pin 34 is very close to bottom dead center position on its downward turret operating stroke. This is important because at this time the speed of the turret will have been reduced so close to zero, by virtue of the extremely close proximity of the crank pin 34 to its lower dead center position that the remaining few degrees of movement of the crank pin 34 in the direction of its bottom dead center position required to retract the turret operating latch dog 42 from a cooperating flange notch 44 will produce no appreciable turret driving movement.

Turret brake

Although, as explained above, the turret conveyor will be moving extremely slow at times of insertion of the indexing plunger 55 into cooperating indexing recesses of the turret, it will, nevertheless, be appreciated that the inertia of the turret, even under these conditions, will be sufficient to produce quite a shock upon sudden insertion of the indexing plunger 55 into a cooperating indexing recess 58 if the entire inertia of the turret conveyor were to be absorbed through the indexing plunger 55. Hence, it is desirable in the construction illustrated, to provide an auxiliary means for absorbing a large part of the inertia of the turret independently of the indexing plunger 55. For this purpose, I provide friction braking mechanism comprising four brake flanges 81, each of which is anchored to and projects radially from the free end portion of an arm 7 of the turret 3. Cooperating singularly with these brake flanges 81 is an opposed pair of brake shoes 82, having friction facings or linings 83 adjacent their free edges. In the machine illustrated, the brake shoes 82 are integrally formed with or welded to a plate 84 at their edge portions opposite the facings 83 and said shoes 82 having sufficient flexibility to permit setting and release of the brake by the utilization of the inherent flexibility of the plates. In this connection it may be said that the brake is shown in Fig. 24 in its set position, but that the said brake shoes normally flex apart sufficiently to allow free passage therebetween of the brake flanges 81. The brake mechanism is mounted on a forwardly projecting auxiliary frame portion 85 shown best in Figs. 1, 4, 9 and 24. It will, of course, be understood that the frame and other supporting structure for the brake mechanism has a downward passage aligned with the space between the brake shoes 82 to allow passage of the brake flanges 81 under rotation of the turret. The connecting plate 84 between the brake shoes is provided with a rearwardly extending flange 86 that is rigidly secured on the auxiliary frame structure 85 and has rigidly secured to its extended end portion a diagonal brace member 87 which is rigidly secured at its other end to the upper portion of the plate 84 of the brake.

The operating mechanism for this brake is as follows: Three eye bolts 88 extend loosely through the opposed brake shoes 82 as shown best in Fig. 24, these eye bolts being spaced from the inner longitudinal edges of the brake facings 83 and out of the path of travel of the brake flanges 81. The eyes of the eye bolts 88 are all positioned on a common side of the brake, and the other ends of the eye bolts are provided with nuts forming bases of reaction when brake setting tension is applied to the bolts through their eyes. Pivoted at 89 to the eye-equipped ends of the bolts 88 are cams 90, each of which works against an adjacent face of an adjacent brake plate 82 and is integrally formed on a link or arm 91. The outer ends of the several links or arms 91 are all pivoted to a common connecting bar 92 for common pivotal movements by a crank arm 93 and connecting rod 94. The crank arm 93 is fast on a crank shaft 95 journalled in bearing flanges 96 extending from the frame structure 85 as shown best in Fig. 9. By reference to Fig. 24 it will be seen that when the crank arm 93 is in the position shown in said figure, the brake is set through the action of the cams 90 and that releasing of the brake may be effected by a counter-clockwise movement of the crank arm 93.

In the present embodiment of the invention, the brake is further set by a coil tension spring 97 acting through a link 98 and an operating arm 99 fast on one end of the brake operating crank shaft 95. The other end of the spring 97 is anchored fast to the auxiliary frame 85. The tension of the spring 97 is not sufficient to completely close the gap between the cooperating brake shoes 82, but is sufficient to flex the plates sufficiently to reduce the gap between the plates to less than the thicknesses of the brake flanges 81 in the absence of an interposed brake flange 81. Hence, in this instance, the brake flanges will be subject to the setting action of the spring 97, acting through its brake setting connections including the cams 90. The leading edges of the brake flanges are pointed or wedge shaped, as shown best at 81' in Fig. 24, for the purpose of piloting the brake flanges into the gap between the opposed brake shoe facings 83, which will be less than the thickness of said plates. Releasing of the brake described is accomplished through mechanism comprising a cam 100 mounted fast on shaft 26, a crank arm 101 provided with a cam following roller 102 for co-operation with the cam 100, a shaft 103 journalled in bearings 104 and on which the crank arm 101 is mounted for common rocking movements, an arm 105 mounted fast on the shaft 103, and a rod 106 extending between the upper end of the arm 105 and the upper end of the arm 99. With the arrangement illustrated, the brake shoes 82 will be subject to the brake setting action of the spring 97 from the time the cam following roller 102 passes off of the heel 107 of the cam 100 until it is engaged and moved by the toe 108 of the cam 100. Actually, with the arrangement illustrated, the cam roller 102 will ride off of the heel 107 of the cam 100 and subject the brake shoes 82 to the yielding action of the brake setting spring 97 during each movement of the turret from one station to the other, and at times in advance of the entry of a brake flange 81 into the space between the cooperating brake shoes, and the said brake shoes will be relieved of the brake setting action of the spring 97, through the action of the cam 100, immediately following the entry of the indexing plunger 55 into a cooperating indexing aperture 58.

*Partition dispensers*

For delivering or feeding cell case partitions X and X' to the group of holders 8 and 9, respectively, of each of the arms 7 of the turret, while indexed in the receiving zone A, I provide a group A' of cell case partition dispensers which are individually indicated as entireties by 109 and 110, respectively; and for delivering or feeding cell case partitions Y and Y' into positions of crossed assembled relationship with partitions held by the group of holders 8 and X and X', respectively, of each turret arm 7, while the latter are indexed in an assembly zone or station B, I provide a group B' of cell case partition dispensers which are individually indicated as entireties by 111 and 112, respectively. The group A' of dispensers are located immediately adjacent the receiving zone A, and the group B' of dispensers are located adjacent the assembly zone B and are located on the same side of the turret as are the group of dispensers A'. The dispensers 109, 110, 111, and 112 each comprise a magazine portion for a stack of cell case partitions and an underlying reciprocating pusher type conveyor mechanism. The bottom of the magazine portion of the dispenser 109 is formed by a table 113, the bottom of the magazine portion of the dispenser 110 is formed by a table 114, the bottom of the magazine portion of dispenser 111 is formed by a table 115 and the bottom of the magazine portion of the dispenser 112 is formed by a table 116. Other parts of the magazine portions of the dispensers 109 to 112, inclusive, are identical. The magazine portions of the dispensers 109 to 112, inclusive, respectively, each further include a laterally spaced pair of central apertured side plates 117 (see Figs 1 and 7), an apertured front plate 118 (see Figs. 2 and 7), a laterally spaced pair of angle iron guides 119 (see Figs. 1, 2, 3 and 7) adapted to embrace opposite front corners of the stack of partitions, and a laterally spaced pair of vertically disposed guides 120 each adapted to engage the rear edges of the several partitions of a stack (see Figs. 3 and 7). The laterally spaced side plates 117 of each magazine are rigidly secured together by a cooperating front plate 118, which is bolted or otherwise secured thereto by bolts or the like 121 (see Figs. 1 and 2). The laterally spaced vertical angle guides 119 of each magazine are adjustably connected to the cooperating front plate 118 by nut-equipped stud bolts 122 working in horizontal slots in said front plate, the said stud bolts being welded or otherwise rigidly anchored to the angle guides 119, whereby to permit variable spacing between the said angle guides 119 to accommodate partitions of varying lengths. To accommodate the magazines to partitions of different depths, the rear guides 120 of each magazine are adjustably connected to the side plates 117 by anchoring brackets 123, and nut-equipped anchoring screws 124 working through the offset ends of the anchoring brackets 123 and slots 125 in the opposed laterally spaced side plates 117. The side plates 117 are outwardly flanged at their bottoms and are anchored to their respective cooperating tables 113, 114, 115 and 116 by means of toe clamps 126 for bodily forward and rearward adjusting movements of the magazines with respect to their cooperating tables. In the preferred form illustrated, the toe clamps 126 are directly carried by bars 127 which are, in turn, spaced from their respective cooperating tables by shim strips 128 (see particularly Fig. 8), and which are anchored fast to the said tables each by a number of cap screws 129 passing through the bars 127, shim strips 128, and the underlying table, and is screw-threaded into bars 130 corresponding to and underlying the bars 127.

Figure 1:
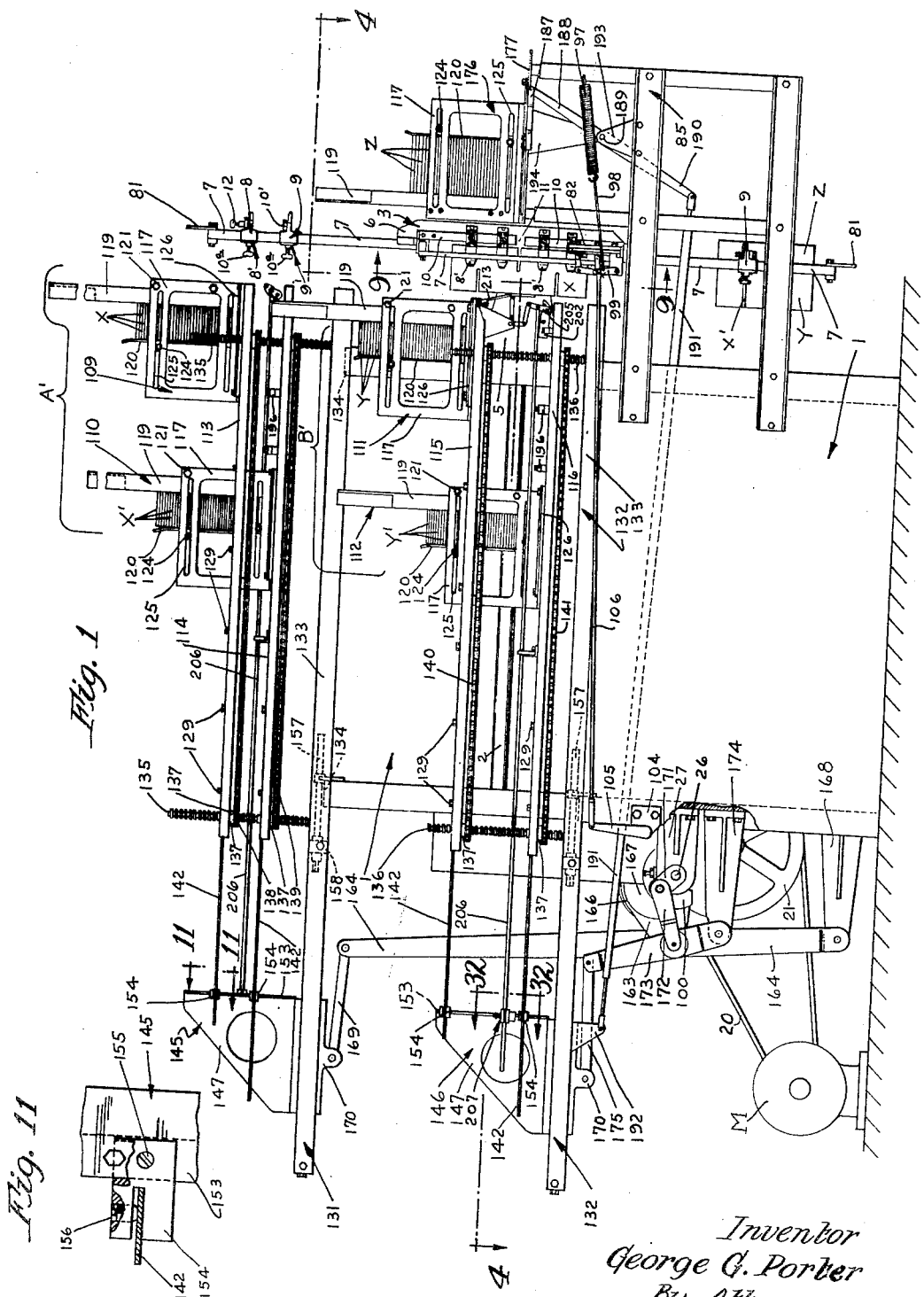
Fig. 1 is a view in side elevation of a machine incorporating the invention.

The two tables 113 and 114 of dispenser group A' are independently vertically adjustably mounted on a common bed frame 131, and the two tables 115 and 116 of dispenser group B' are mounted for independent vertical movements on a similar common bed frame 132. The bed frames 131 and 132 are mounted on the base frame structure 1 for independent forward and rearward adjusting movements. As illustrated, the bed frames 131 and 132 are merely gravity seated on the base frame structure and are guided for true forward and rearward adjusting movements on said frame by providing thereon laterally spaced guide rail portions 133, which overlap and cooperate with upstanding guide flanges 134 on the base frame structure by having the guide rail portions 133 of the bed frames 131 and 132 overlap and cooperate with upstanding guide flanges 134. As best seen in Figs. 1 and 7, the table 113 of dispenser group A' overlies the table 114 of said group, and the table 115 of dispenser group B' directly overlies the table 116 of the last said group. The bed frame 131 supports the tables 113 and 114 by means including four upstanding adjusting screws 135 having their lower ends anchored fast to said bed frame 131 and the tables 115 and 116 are supported from the bed frame 132 by means including four adjusting screws 136 having their lower ends secured fast to the bed frame 132. The adjusting screws 135 and 136 work loosely through the tables 113, 114, 115 and 116, and their bars 127, shim strips 128 and bars 130, and are provided with sprocket wheel-equipped nuts 137 threaded on the said adjusting screws 135 and 136 and engage the undersides of the bars 130 of the table 113 to 116, inclusive, respectively, whereby to adjustably support the tables 113 to 116, inclusive, on their respective cooperating adjusting screws. Running over all four sprocket wheel equipped nuts 137 supporting table 113 is an endless link belt or chain 138; running over all four of the sprocket wheel-equipped nuts 137 supporting table 114 is an endless link belt or chain 139; running over all four of the sprocket wheel equipped nuts 137 supporting table 115 is an endless link belt or chain 140; and running over all four of the sprocket wheel equipped nuts 137 supporting table 116 is an endless link belt or chain 141. By manual selective rotation of these chains 138 to 141, inclusive, respectively, the tables 113 to 116, inclusive, respectively, together with the mechanisms carried thereby can be independently raised or lowered for an important purpose hereinafter to be made clear, but which, briefly stated, is the variable location of and spacing between adjacent partitions collectively delivered to the receiving and assembly zones by dispensers of common groups.

The pusher-type conveyor mechanism of each dispenser mechanism 109 to 112, inclusive, respectively, includes a laterally spaced pair of pusher arms 142, which are flexible in vertical planes to permit independent, vertical adjustments of their front and rear ends. In the forms shown, these pusher arms 142 of each pair are integrally formed from a common sheet of metal. As shown, the forward end portions of each pair of arms 142 are connected by a plate 143 rigidly carrying a pusher plate 144 (see particularly Figs. 4 and 7), and the forward end portions of each pair of arms 142 and their connecting plate 143 overlie and ride on the upper surface of a table 113, 114, 115 or 116. By reference now particularly to Fig. 8, it will be seen that the opposite pusher arms 142 of each pair thereof run in opposed forwardly and rearwardly extending guide channels formed between a table 113, 114, 115, 116, and the overlying bars 127, and formed as a result of the interposition between said tables and said bars 127 of the shim strips 128, said channels extending from rear to front ends of the tables. The extended rear ends of the pusher arms 124 of the dispensers 109 and 110 comprising dispenser group A' are adjustably anchored to a common reciprocating head 145 that is longitudinally slidably mounted on the extended rear end portion of the bed frame 131 (see particularly Figs. 1 and 3), and the extended rear ends of the pusher arms 142 of the dispensing mechanisms of dispenser group B' are similarly adjustably connected to a common head 146 mounted for forward and rearward reciprocation on the extended rear end portion of bed frame 132 (also see particularly Figs. 1 and 3). The heads 145 and 146 are, in the form illustrated, cast structures each comprising laterally spaced side plates 147 tied together by a cross bar portion 148, and a bottom member or plate portion 149 (see particularly Fig. 3). The reciprocating heads 145 and 146 are guided for straight-line reciprocation on the bed frames 131 and 132, respectively, by depending guide flanges 150 formed on the bottoms 149 of the said heads 145 and 146 and embracing the inner longitudinal sides of the opposite rails 133 of the beds 131 and 132 and depending guide flanges 151 depending from the laterally intermediate portion of the bottom members 149 and embracing opposite sides of a forwardly and rearwardly extending guide bar 152 forming a part of each of said beds 131 and 132. The side plates 147 of the heads 145 and 146 are provided with upstanding laterally outwardly projecting anchoring flanges 153 to which the rearwardly extended end portions of laterally opposite pusher arms 142 are connected to the said laterally opposite vertical flanges 153 of the side plates 147 for horizontal and vertical adjustments through the medium of anchoring blocks 154, of which there is one for each pusher arm 142 (see particularly Fig. 11). The anchoring blocks 154 are vertically slotted to receive the anchoring flanges 153, to which they are anchored by set screws 155 allowing vertical adjustments on said flanges 153 (see Fig. 11). Also by reference to Fig. 11 it will be seen that the anchoring blocks 154 are horizontally slotted to receive their respective cooperating pusher arms 142 to which they are anchored by means of set screws 156 allowing horizontal adjustments of the arms 142 with respect to the heads 145 and 146. Vertical adjustments of the anchoring blocks 154 on the heads 145 and 146 are important for the purpose of establishing alignment between opposite end portions of the pusher rods 142 in various vertically adjusted positions of their respective cooperating tables 113 to 116, inclusive, respectively, and horizontal adjustments of the pusher arms 142 in their respective anchoring blocks 154 are important in order to allow for forward and rearward adjustments of the bed frames 131 and 132 each with respect to their cooperating head 145 or 146. In other words, whenever a bed 131 or 132 is to be adjusted forwardly or rearwardly to allow, for example, for the handling of partitions of different depths, the set screws 156 will be loosened and reset at the completion of the forward or rearward adjustment. For the purpose of vertical adjustments of the tables 113 to 116, inclusive, the set screws 155 will be similarly loosened and reset at the completion of the adjustment, although if the vertical adjustment is not great, vertical flexibility of the pusher arms 142 will permit vertical readjustment of the blocks 154 after completion of the corresponding vertical adjustments of the cooperating tables.

For the purpose of conveniently imparting independent adjusting movements to the bed frames 131 and 132, I provide for each of said bed frame an adjusting screw 157 (see Figs. 1, 4 and 5). The adjusting screw 157 for each of the bed frames 131 and 132 is journalled in a bed frame cross member 158 and is held against endwise movements with respect to said cross member by end thrust bearings 159. One end of each of said adjustment screws 157 is provided with a cross-sectionally angular head portion 160 for reception of a suitable wrench crank or the like, and the intermediate portion of each screw 157 works in an internally threaded nut 161 anchored to the base frame 1.

The drive mechanism for reciprocating the head 145 in definite and proper timed relation to the turret comprises, in addition to drive mechanism already described and common to other mechanisms heretofore described, an eccentric 162 keyed fast on shaft 26, an arm 163 pivoted to a lever 164 at 165 and having a strap-acting portion 166 embracing the eccentric 162 and retained thereon by opposed eccentric anchored side plates 167. The lower end of the lever 164 is pivoted to the base frame 1 through the medium of a bracket 168, and the upper end of said lever 164 is pivotally connetced to the bottom of the head 145 through the medium of a connecting rod 169 and a bifurcated boss anchoring lug 170. One end of the connecting rod 169 is pivoted to the upper end of the lever 164, and the other end thereof is pivoted in said bifurcated anchoring lug 170, which lug, 170, is rigidly secured to the bottom portions of the head flanges 151 and extends under the cooperating bed frame member guide bar 152. The driving connections from the shaft 26 to the head 146, and which drive the said head in definite timed relationship to the head 145, the turret, and other mechanism heretofore described, comprise a crank 171 fast on the shaft 26, a connecting arm 172 pivoted at its one end to the crank 171, a lever 173 pivoted at its lower end to the base frame through a bracket 174 and having the connecting arm 172 intermediately pivoted thereto, and a connecting rod 175 pivoted at one end to the upper end of the lever 173 and at its other end to a bifurcated anchoring lug 170 carried by the underside of the head 146 in the same manner that the before-described anchoring lug 170 was connected to the head 145. Through the driving connections from the shaft 26 and above described, the heads 145 and 146 and their connected pusher arms 142 and partition pusher plates 144 are reciprocated in unison, being advanced in the direction of the turret once during each period that the turret is at rest in each of its four indexed positions, and being retracted during each subsequent advance of the turret to its next index position.

Preferably, and in the embodiment of the invention illustrated, I provide a dispenser (in this case a single dispenser) 176 for cooperation with the dispensers 111 and 112 comprising dispenser group B', and which is also located adjacent the assembly zone B, but at the side of the turret conveyor 3 opposite the said dispensers 111 and 112. This dispenser 176 is mounted on the auxiliary frame section 85 and, because it is identical in many respects with the dispensers 109 to 112, inclusive, parts thereof corresponding to parts of said dispensers 109 to 112, inclusive, will be indicated by like characters. The table portion of this dispenser 176, being somewhat different than the tables of the aforesaid dispensers, is indicated by the numeral 177 and is anchored fast on the auxiliary frame 85 by welding or the like at 178, and is so positioned that the bottom like at 178, and is so positioned that the bottom of a stack thereof contained in the partition Z of a stack thereof contained in the magazine portion of the dispenser 176 will be aligned with the passageway 11 between the cooperating clip mounting arms 10 of the turret arms 7 when the same are positioned in the assembly zone or station B. In the arrangement illustrated, the top of the table 177 of the dispenser 176 will be in a horizontal plane midway between the horizontal plane of the top of the table 115 of dispenser 111, and the top of the table 116 of the dispenser 112. Side plates 117 of the magazine portion of the dispenser 176 are anchored to the table 177 by means of nut-equipped bolts 179, underlying bars 180 and spacers 181, the latter of which space the intermediate portions of the bars 180 from the underlying table 177 to provide forwardly and rearwardly extending slots 182 each underlying the side plates 117. Slots 182 provide guideways for the laterally projecting end portions 183 of a pusher plate 184 having a built-up portion 185 for the purpose of increasing the total thickness thereof. This pusher plate 184 is advanced toward and retracted from the turret in unison with the pusher plates 144 of dispensers 111 and 112 by mechanism as follows: Flanges 186 on opposite ends of the pusher plate 184 connect arms 187 each pivoted at one end to a flange 188 and at its other end to an arm 189 that is anchored at its lower end fast on a rock shaft 189, a rock arm 190 having one end fast on the rock shaft 189, a connecting rod 191 pivoted at one end to the free end of arm 190 and at its other end to a flange 192 depending from the bottom of head 146. The rock shaft 189 is journalled in bearing brackets 193 and 194 from the auxiliary frame 85.

By reference now particularly to Figs. 1, 4 and 7 it will be seen that the pusher plates 144 of the dispensers 109 to 112, inclusive, respectively, and the pusher plate 184 of the dispenser 176 all engage and push directly on the bottom of its stack XX', YY' or Z. The pusher plate engaged bottom partition of the partition stacks X of the dispenser 109 is pushed directly by the pusher into the aligned spring clips 8' of a holder 8 of a conveyor arm 7 located in the receiving zone A, and the pusher plate engaged bottom partition Y of the dispenser 111, and the bottom pusher plate engaged partition Z of the dispenser 176 are pushed directly into crossed assembled relationship with a group of partitions X and X' held in the spring clips 8' and 9' of the holders 8 and 9, of a conveyor arm 7 positioned in the assembly zone B. However, because the magazine portions of the dispensers 110 and 112 are spaced considerably further from the turret conveyor 3 than are the magazine portions of the dispensers 109, 111, and 176, and because the throw or travel of all of the dispenser pusher plates is equal, the pusher plate engaged bottom partitions of the dispensers 110 and 112 each push a train of edge butted partitions X' and Y', respectively. Under each forward movement of the pusher plate of the dispenser 110, the front partition X' of the train thereof supported on the table 114 will be pushed into aligned spring clips of the holder 9 of the turret arm 7 located in the receiving zone A, and under each forward reciprocation of the pusher plate 144 of the dispenser 112, the forward partition Y' of the train thereof supported on the table 116 will be pushed into crossed assembled relationship with a group of partitions X and X' held in the holders 8 and 9 of the conveyor arm then located in the assembly zone B.

To prevent the trains of partitions X' and Y' from buckling upwardly from their respective underlying tables 114 and 116, I provide a laterally spaced pair of guide shoes 195 overlying the trains of partitions X' and Y', and which are supported from the tables 114 and 116 through the medium of transverse supporting bars 196 (see particularly Figs. 4 and 7). Also, by reference particularly to Figs. 4, 2 and 7, it will be seen that the trains of partitions X' and Y' are guided against possible lateral shifting movements by laterally spaced pairs of guide rails 197 laterally adjustably supported on the transverse supporting bars 196 by anchoring plates 197' and screws 197'' (see Figs. 4 and 27). Although the above-described guide shoes 195 and guide rails 197 are specifically illustrated only in connection with the dispenser 112 and its table 116, it will be understood that similar guide shoes and guide rails are also provided in connection with the dispenser 110 and its table 114.

When the machine is adjusted for partitions of the depth to be run, the front edges of the tables 113 to 116, inclusive, will be rearwardly spaced from the vertical plane of the faces of the stop portions 8a of the several spring clips 8' and 9', a distance somewhat greater than the depth of the said partitions to be run, so as to provide a clearance between partitions X and X' held in said holders and other partitions assembled therewith and the front faces of said tables (see particularly Figs. 1 and 7). Since the pusher plates 144 of dispensers 109 and 111 each deliver a partition during each forward stroke and then withdraw before the turret and partitions carried thereby are advanced to the next index position, there will be no interference to turret rotation set up by the dispenser mechanisms 109 or 111.

The pusher plates 144 of dispensers 110 and 112 deliver partitions X' and Y' to the turret through trains of such partitions during their forward strokes, and then withdraw from the train of partitions, leaving the partitions just rearward of those finally delivered to the turret projecting beyond the ends of their respective tables 114 and 116, and in abutting engagement with those just delivered to the turret. Hence, it is highly desirable to provide automatic mechanism for retracting the trains of partitions X' and Y' supported on the tables 114 and 116, respectively, after each delivery of partitions from ends of such partition trains, to bring the forward edge of the partitions overlapping the front ends of tables 114 and 116 back at least to points of alignment with the front edges of said tables, to thereby eliminate possible interference between partitions supported on the tables and partitions supported by the turret conveyor during the next subsequent advance movement of the turret conveyor to its next index position. In the embodiment of the invention illustrated, this important function is accomplished by mechanism as follows: The dispenser mechanisms 110 and 112 are each provided with a laterally spaced pair of pawl-acting pusher fingers 198 positioned to overlie and engage the most forwardly located table supported partition of the train of partitions X' or Y'. These pawl-acting pusher fingers each have a sharpened partition engaging tooth 199 at its free rear end portion. The forwardly projecting ends of opposite fingers 198 of each pair thereof are pivotally connected to the free end of a laterally opposite bifurcated crank arm 200. Each pair of cranks 200 is mounted fast on a different rock shaft 201, one overlying the table 114 and the other overlying the table 116. The shafts 201 are journalled in brackets 202 supported by the most forwardly located transverse bars 196 of their respective dispensers 110 and 112. The free ends of the fingers 198 are subject to the yielding biasing pressure of springs 203 to move pivotally on the cranks 200 in a downward partition engaging direction, but it should be noted that the bifurcated cranks 200 have stop portions 204 definitely limiting pivotal movements of the fingers 198 on the axis of their pivots to their cranks 200. Hence, it will be seen that under clockwise rotation of the cranks in respect to Fig. 28 the toothed free ends 199 of the fingers 198 will be lifted free of the underlying partitions. The rock shafts 201 are operated by identical mechanisms each comprising an arm 205 fast on rock shaft 201, a connecting rod 206 pivoted at one end to the free end of arm 205 and connected at its other end, one to the reciprocating head 145 and the other to the reciprocating head 146 by a friction driving device 207 (see Fig. 32). Each of said friction driving devices 207 comprises opposed pairs of notched clamping blocks 208 embracing opposite portions of a connecting rod 206. One clamping block 208 of each pair thereof is anchored fast to a flange 153 of a cooperating head 145 and 146 through the medium of a bracket 209 and the other clamping block 208 of each pair thereof is yieldingly pressed in the direction of its cooperating block 208 to apply suitable frictional driving pressure to the interposed rod 206 by a pair of coil compression springs 210 each mounted on the projecting upper end of an adjusting screw 211, working loosely through the floating upper block 208 and anchored fast in the lower anchored block 208.

With the mechanism described in the immediately preceding paragraph, it will be obvious that the friction driving devices 207 between the reciprocating heads 145 and 146 and their respective cooperating connecting rods 206 will tend to reciprocate the rods 206 in common with said heads. However, by reference particularly to Figs. 29 and 30, it will be seen that pivotal movements of the rock arms 205 are limited by spaced stops 212 on the brackets 202 to much less throw than would be imparted thereto under full movements of the rods 206 with the heads 145 and 146. Hence, the friction driving devices 207 will drive the rods 206 in each direction of reciprocation only to the limits determined by the stops 212. Under forward movements of the heads 145 and 146, the rods 206, crank arms 205, rock shafts 201, bifurcated cranks 200 and pawl-acting fingers 198 will be moved from the extreme positions shown in Fig. 30 to their extreme positions shown in Fig. 29. and in the latter noted of which figures, it will be seen that the pawl-acting fingers 198 are positioned at the extreme of an inoperative or return movement where they are raised free of an underlying partition. Under rearward movements of the heads 145 and 146, the elements 207, 206, 205, 201, 200, and 198 will be moved from the extreme positions of Fig. 29 to the extreme positions of Fig. 30. Under initial rearward movements of the pawl-acting fingers 198, the toothed ends 199 thereof will each be moved into engagement with and will bite slightly into an underlying partition, and during the balance of the rearward movements of said fingers 198, said fingers will each carry the engaged partition and the entire partition train therewith to the extent necessary to bring the leading edge of the foremost partition of the train into alignment with the forward edge of an underlying table 114 or 116.

Because the forward ends of the push rods 206 are carried by and move adjustably upwardly and downwardly with their respective tables 114 and 146, the friction driving devices 207 are vertically adjustably mounted on the flanges 153 in exactly the same manner as are the blocks 154.

Because the forward edges of partitions held in turret holders 8 and 9 are always in the same vertical plane regardless of the varying depths of partitions to which the machine is adjusted, no provision need be made for adjustments of the dispensing unit 176 toward and from the turret. Hence, said dispensing unit 176 is anchored fast to the auxiliary frame 85.

Partitions

In order to lay a better basis for an understanding of mechanism hereinafter to be described, and to lay a better basis for an understanding of the operation of the machine, generally, attention is directed at this point to the partitions X, X', Y, Y' and Z, the details of which are perhaps best shown in Figs. 4, 27, 33 and 34. In Fig. 34, a completed cell case core made up of partitions X, X', Y, Y' and Z is illustrated just as it would appear at the completion of an assembly operation by a machine described. The case or container into which the core made up of partitions X, X', Y, Y' and Z of Fig. 34 is to be placed is not illustrated, but it may be assumed that the inside surface of the case will engage the vertical ends of the several partitions and that the center partition Z will extend the full depth of the inside of the case and will serve to lock the cell case partition unit against bodily up and down movement within the case. In accordance with conventional practice, the cell case partitions X, X', Y, Y' and Z are each provided with a transverse slot at each line of intersection with another partition. These slots open through the longitudinal edges of the partitions and extend transversely of the partitions to a depth equal to approximately one-half the depth of the partitions X', Y and Y'. In the assembled cell case partition unit, the slots of partitions X and X' are aligned with corresponding slots in partitions Y, Y' and Z, and the combined depth of the aligned slots in intersecting partitions approximately equals the depth of a partition X, X', Y or Y'. This relationship of slots is perhaps best shown in Fig. 33. Of course, when the partitions, thus slotted, are assembled, the intersecting partitions will be all underlocked against longitudinal sliding movements one on the other. Of course, it will be understood that the width of the partition slots will be approximately equal to the thickness of the material from which the partitions are formed. However, it will be appreciated that in the case of very shallow partitions, the so-called slots might, in some instances, be more properly described as notches. Furthermore, it will be appreciated that in some cases where thin partition material is used, slits may be used in place of slots. In any event, however, it should be understood that the term "slots" is herein used in a broad liberal sense as a generic term covering slots, slits, or notches.

Locking of partitions in holders

As previously indicated, the partitions Y, Y' and Z are, in the preferred embodiment of the invention illustrated, simultaneously assembled on partitions X and X' carried by the turret holders 8 and 9, the partition group comprising partitions Y and Y' being applied in opposite directions to the partition Z. Although the frictional resistance set up between partitions X, X' and Z during the assembly operation will tend to force the partitions X and X' out of the spring clips 8' and 9', it will be appreciated that this tendency will usually be more than offset by the frictional resistance set up in the opposite direction between partitions Y, Y', X and X'. However, because of possible errors in slot dimensions and alignment, I have found it highly desirable to provide automatic mechanism for positively locking the partitions X and X' in the spring clips 8' and 9' of the holders 8 and 9, respectively, during the assembly operation, and to this end I provide mechanism shown best in Figs. 1, 27, 29, 30 and 31. This mechanism comprises a reaction plate 213 having a work-engaging face 214, and which is horizontally pivoted at 215 to the underside of table 115. The intermediate portion of the reaction plate 213 is pivotally connected to one end of a link 216, the other end of which is pivoted to a bell crank 217, the intermediate portion of which is pivoted at 218 to an anchoring flange 219 depending from the underside of table 115. The other end of the bell crank 217 is pivoted to a link 220 having its other end pivoted to an operating arm 221 fast on rock shaft 201. The reaction plate 213 is retracted to its inoperative position shown in Fig. 30 under rotation of the turret from one station to another; but under initial advance movements of the reciprocating head 146, the said reaction plate 213 will be advanced into engagement with the rear edges of partitions X and X' positioned in the assembly zone by the holders 8 and 9 of a turret arm, through connections comprising friction drive devices 207, connecting rod 206, arm 205, rock shaft 201, arm 221, link 220, bell crank 217 and link 216. The reaction plate 213 will remain in its operating position of Fig. 29 during the entire assembly operation and will positively prevent the partitions X and X' from being dislodged from or moved in the holders 8 and 9 under frictional resistance set up therebetween and the partition X during said assembly operation. Of course, with the mechanism described, the said reaction plate 213 will be withdrawn back to its inoperative position of Fig. 30 under initial return movements of the reciprocating head 146.

Disposal of assembled partition units

In the machine of the kind described, it is desirable to provide automatic mechanism for removing completely assembled cell case partition units, such as shown in Fig. 34. In the embodiment of the invention illustrated, this is accomplished by mechanism presently to be described: Mounted on the base frame 1 at one side thereof back of a turret arm position 180 degrees spaced from the assembly zone B is a partition unit removing mechanism indicated as an entirety by 222 (see particularly Figs. 2, 3, 5, 12, 13, 14, 15 and 16). As illustrated, this mechanism comprises a group of partition reaction clamps 223 for engagement with partitions X' and a corresponding group of partition reaction clamps 224 for engagement with partitions X of completely assembled partition core units. Each clamp 223 and 224 comprises a cooperating pair of clamping jaws 225 and 226. Cooperating jaws 225 and 226 (see Fig. 14) of each clamp converge inwardly to facilitate insertion therebetween of a cell case partition, and to provide inwardly diverging gripping teeth 227. The intermediate portions of jaws 226 of clamps 223 and 224 are anchored fast at 228, by welding or the like, to opposite vertically disposed legs of a composite H-shaped plate 229, which plate, in turn, is anchored fast to the projected ends of a pair of laterally spaced parallel slide rods or shafts 230 (see Figs. 2 and 16). The said slide rods or shafts 230 extend longitudinally of the machine and are mounted for longitudinal sliding movements in a bearing bracket 231 (see Figs. 12 and 13), mounted fast on the free end of horizontally disposed supporting arm 232 from the base frame (see Figs. 1 and 3). The cooperating jaws 225 and 226 of clamps 223 and 224 are pivoted together at their inner ends at 233, as shown best in Figs. 12, 13, 14, and 16. The cooperating jaws 225 and 226 of the clamps 223 and 224 are shown in their open positions in Fig. 15 and are adapted to be closed to provide gripping engagement between the teeth 227 thereof and an interposed partition, through mechanism involving a cam 234 mounted fast on shaft 26, a rocker arm 235 intermediately pivoted on a bracket 236 from the frame 1 and provided at its free end with a cam following roller 237, a rigid link 238, a rock arm 239, a short rock shaft 240, a rock arm 241, a rigid horizontal link 242 (see Fig. 18), a rock arm 243 fast on a short rock shaft 244, a rock arm 245 also fast on shaft 244 and having a roller equipped free end 246 which rides on the upper surface of a connecting bar 247 pivotally extending between and pivotally connected to spaced rock arms 248 and 249. The lower ends of rock arms 248 and 249 are pivoted to the upper sliding rod or shaft 230 (see particularly Figs. 5, 12, and 13). Rock arm 249 is yieldingly biased in a counter-clockwise direction with respect to Figs. 12 and 13 by a coil tension spring 250 and the intermediate portion of rock arm 249 is pivotally connected at 251 (see Figs. 12, 13, 15 and 16) to an arm 252 fast on a coupling sleeve 253. Mounted in the cylindrical bore of the sleeve 253 are the spherical heads 254 of opposite slightly projecting rock arms 255, the outer ends of which are provided with heads 256 having anchoring flanges 257 riveted or otherwise rigidly secured to opposite vertical tie bars 258. One of the tie bars 258 extends between and is welded or otherwise rigidly secured to the jaws 225 of all of the clamps 223, and the other tie bar 258 is welded or otherwise rigidly secured to all of the jaws 225 of all of the clamps 224. It will be noted that the jaw 225 of one of the clamps 223 and one of the clamps 224 is provided with a stop lug 259 to limit closing movements of their respective clamps sufficiently to prevent undue defacing of the partitions. The slide rods or shafts 230 are reciprocated in timed relation to the turret conveyor 3 by cams 260 and 261 on shaft 26 through operating connections comprising a cam following roller 262 mounted on the end of an arm 263 and riding on the peripheral face of the cam 260, a cam following roller 264 mounted on the free end of an arm 265 and riding on the peripheral face of the cam 261, a shaft 266 journalled in spaced bearing brackets 267 and 236 from the frame 1 and on which the upper ends of arms 263 and 265 are rigidly mounted by welding or the like between a spacer acting bearing sleeve 268 also fast on the shaft 266, an upwardly extending arm 269 also fast on shaft 266, a connecting rod 270 (see Fig. 17), a short lever 271 (see particularly Fig. 12) fast on a frame journalled shaft 272, a long operating arm 273 also fast on shaft 272, and a rigid link 274 from the upper end of arm 273 (see Fig. 12) to the free end of the upper slide rod or shaft 230 at 275 (see Fig. 12). By reference to Figs. 2 and 3, it will be seen that the shaft 272 is journalled in a long bearing sleeve 276 which is secured fast at its inner end to the frame structure 1 and at its other end is supported from the frame 1 by diagonal braces 277. The mechanism immediately above described retracts the completed cell case partition units or cores from the turret holders 8 and 9 during a part of the next subsequent movement of the turret conveyor to its next station.

The mechanism immediately above described withdraws the finished cell case partition units or cores from the turret arm holders 8 and 9 and supports the same independently of the holders 8 and 9 during a portion of the next subsequent movement of the turret conveyor to its next station. Hence, it is necessary to provide mechanism for ejecting the finished cell case partition cores or units from the clamps 223 and 224 in order to finally dispose of the finished units or cores, and for this purpose I provide mechanism comprising a laterally spaced pair of vertically disposed pusher bars 278 (see Figs. 12 to 14, inclusive) each mounted on the free ends of a laterally spaced pair of slide arms 279 that are slidably mounted in brackets 280 from the H-shaped frame 229 (see Figs. 12 to 16, inclusive). The rear ends of the slide arms 279 of each pair thereof are rigidly connected by a common head 281 (see Figs. 12, 13, and 14). Cooperating with the slide arms is an actuating mechanism involving pusher rods 282 mounted one back of each of the heads 281 for forward and rearward sliding movements in a common bracket 283 from the supporting arm 232 (see Fig. 3). Forward movements of these push rods 282 in the bracket 283 are limited by stops in the nature of cotter pins 284, and said rods are yieldingly biased in a forward direction by coil compression springs 285 applied on the intermediate portions of said rods and compressed between the rear ends of the brackets 283 and stop shoulders 286 on said rods 282.

The operation of the above described mechanism for disposing of the completed cell case partition units or cores is as follows: In Figs. 12, and 14 to 18, inclusive, the parts of this mechanism are shown by full lines in the positions that they assume at the time the turret is originally indexed in any one of its four indexed positions, the partition retracting clamps 223 and 224 and the pusher bar 272 being then retracted to their inoperative positions where they are rearwardly spaced from the partitions held in the holders 8 and 9 of the turret. Following indexing of the turret in any one of its four indexed positions, rotation of the cams 260 and 261 will impart a counter-clockwise rocking movement in respect to Fig. 17 to the roller equipped arms 263 and 265 and arm 269, which will cause the link or rod 270 to move rearwardly or to the left in respect to Fig. 17 and to the right in respect to Fig. 12. This rearward movement of link 270 will impart to lever 271, shaft 272 and arm 273 a counter-clockwise movement with respect to Fig. 12 to the position of arm 273 represented by dotted lines in Fig. 12. This movement of arm 273 from its full line position of Fig. 12 to its dotted line position of Fig. 12 will, through rigid link 274 and slide rods 230, cause a bodily forward movement of the several partition clamps 223 and 224 from their inoperative full line positions of Fig. 12 to their initial partition receiving positions shown by dotted lines in Fig. 12. At this point the clamps 223 have received the vertically disposed partition X' of a finished cell case core unit, and the clamps 224 have received a vertically disposed partition X of such a cell core unit, but the opposite jaws of said clamps 223 and 224 have not yet been brought into biting engagement with their respective cooperating partitions. Before going further, it should also be noted that during the initial portion of the above operation, bodily forward movement of the several clamps 223 and 224 from their inoperative positions to their initial partition receiving positions, the pusher bars 278 will be advanced therewith into engagement with the rear edges of the partitions of the completed cell case core (see dotted line positions of Fig. 12). After engagement of the said pusher bars 278, the said pusher bars will stand still during the balance of the said advance movements of the clamps 223 and 224 and during which time the brackets 280 will simply slide forwardly over the rods 279. The next function is to tighten the clamps 223 and 224 on their respectively received partitions X' or X and this is accomplished as a result of engagement of the toe end 287 of cam 234 with the cam following roller 237 of an arm 235, and which takes place while the turret is stationary in each of its four indexed positions. When the cam 234 thus engages rock arm 235, link 238 will move downwardly causing a clockwise rocking movement of arms 239 and 241 with respect to Fig. 18, and a rearward movement of link 242, causing a clockwise movement of arm 243, shaft 244, arm 245 and roller 246, which roller will in turn move the bar link 247 downwardly to produce a clockwise pivotal movement of rock arm 249 on its pivot point 249'. This rearward pivotal rocking movement of rock arm 249 on its pivot 249', will, in turn, cause a rearward movement of the intermediate pivot point 251 of the arm 249 causing a corresponding rearward movement of arm 252 and its coupling sleeve 253 (see Figs. 15 and 16). This rearward movement of coupling sleeve 253 will produce a pivotal movement of each of the spherical head-equipped arms 255, one on the axes 233 of the clamps 223 and the other on the axes 233 of the clamps 224, which will result in closing of the gripping teeth 227 of opposite jaws of the clamps 223 and 224 upon a respective cooperating partition X' and X. Now that the clamps are in gripping engagement with the partitions X' and X of the completed cell case partition unit, and while the turret is still in an indexed position, the cams 260 and 261 will impart a clockwise arcuate movement with respect to Fig. 17 to unitary arms 263, 265, and 269 on the axes of shaft 266, thereby producing a forward movement of link or rod 270. This forward movement of link or rod 270 will move the arm 273 pivotally in a clockwise direction with respect to Figs. 12 and 13 from the dotted line position thereof of Fig. 12 to the full line position thereof of said arm in Fig. 13. This clockwise pivotal movement of arm 273 will carry the link 274 and slide rods or shafts 230 rearwardly from the dotted line position thereof in Fig. 12 to the full line positions thereof in Fig. 13, and, since the several clamps 223 and 224 are mounted for common sliding movements with the rods 230, the said clamps will also be moved rearwardly of the machine from the dotted line positions thereof in Fig. 12 to the full line positions thereof in Fig. 13. Of course, under this rearward movement of the several clamps 223 and 224, the completed cell case partition unit will be moved therewith and will be withdrawn from the holders 8 and 9 of a conveyor or arm supporting the same, thereby leaving the turret conveyor free to rotate independently of the withdrawn cell case partition unit located in the assembly zone 180 degrees spaced from the assembly zone. Under the above described rearward movement of arm 273, link 274, slide rods 230 and the several clamps 223 and 224, the completed cell case partition unit will be carried rearwardly by said clamps; and the pusher bars 278 will be moved rearwardly therewith by virtue of engagement of the partitions of the cell case partition unit with the said pusher bars 278 (see Figs. 12 to 14, inclusive). Under such rearward movement of the pusher bars 278, the slide rods 279 supporting the heads 281 of the slide rods 279 supporting the bars 278 will be brought into engagement with the projecting ends of pusher rods 252 and will move said pusher rods rearwardly to the positions shown in Fig. 13, in which latter figure the spring 285 is shown as compressed or charged. The springs 285 are compressed as shown in Fig. 13 while the turret is still in an indexed position but just prior to the time the turret is advanced from that indexed position to the next indexed position. With the parts so positioned, the turret starts a step of movement from index position to the next, and during the course of such movement, preferably about in the middle of such movement, the cam following roller 237 will ride off of the heel 288 of the cam 234 and permit the arm 235 and parts operated thereby and including the rock arms 249 to be returned to the positions of Figs. 12, 15, 16 and 18 under the action of spring 256, thereby releasing the teeth 227 of clamps 223 and 224 from their respectively engaged partitions X' and X of the finished cell case partition unit. Upon releasing of the clamps, the push bars 278, being now urged forwardly by the compressed springs 285 will advance and move the partitions X and X' out of the clamps 223 and 224, thereby releasing the completed cell case partition unit from the clamps and permitting it to fall free of the machine, where it can be disposed of in any suitable manner. Now while the turret is still moving to its new indexed position, the cams 260 and 261 will, through connections described, move the slide rods or shafts 230 together with the several clamps 223 and 224 and other parts mounted for unitary sliding movements therewith from their full line positions of Fig. 13 to their full line positions of Fig. 12 where they are ready to start a new cycle of operation following the next subsequent indexing of the turret conveyor.

*Closing comments*

In the above specification the various elements of the machine have been described in detail and followed through a complete operation resulting from one complete cycle of the shaft 26, and, of course, the operations described will be repeated for each subsequent cycle of the shaft 26. It will, of course, be appreciated that preparatory to each run the magazines of the dispensers 109, 110, 111, 112, and 176 will be loaded with stacks of slotted partitions, X, X', Y, Y' and Z, respectively, the partitions of each stack thereof being arranged so that corresponding slots thereof are all vertically aligned and that whenever partitions of different dimensions or slot spaces are to be run, the machine will be properly adjusted to accommodate the new requirements.

While the machine described employs only two dispensers in each dispenser group A' and B', it will be obvious that the construction illustrated permits a wide variation in the number of dispensers per group, whereby to accommodate the machine to the assembling of cell case partition cores having widely varying numbers of partitions. Since machines built in accordance with the invention combine this important feature with great versatility of the adjustment for the purpose of handling partitions of different lengths, depths, and slot spacings, it will be clear that a single machine built in accordance with this invention can be used for assembling of cell case partition units of widely varying specifications. Furthermore, it will be clear that such a machine is not only adapted for use in connection with the assembling of cell case cores having widely varying specifications, but can be simply and quickly adjusted to assemble cell case cores of different specifications several times in a single day, if necessary or desirable.

While in the above specification I have described one embodiment which my invention may assume in practice, it will of course, be understood that the same is capable of modification and that modification may be made without departing from the spirit and scope of the invention as expressed in the following claims.

What I claim is:

1. In a cell case partition assembling machine, a partition holder, a cell case partition dispenser located at one side of the partition holder and delivering cell case partitions intermittently and in one direction to said holder, another cell case partition dispenser located at the opposite side of said holder and delivering cell case partitions intermittently and in the opposite direction each into a position of crossed assembled relationship with a partition held by said holder, and mechanism operating said dispensers simultaneously.

2. In a cell case partition assembling machine, a partition holder, a first cell case partition dispenser located at one side of the holder for delivering partitions intermittently to said holder, a second cell case partition dispenser located at the same side of the holder and delivering cell case partitions intermittently each into a position of crossed assembled relationship with a partition held by said holder, a third cell case partition dispenser located at the side of the holder opposite the side thereof on which the first two said dispensers are located for delivering cell case partitions intermittently and each into a position of crossed assembled relationship with the partition held by said holder, and mechanism operating said dispensers in definite timed relation to one another.

3. In a cell case partition assembling machine, partition holder means, said partition holder means comprising spaced friction gripping devices adapted to grip a common cell case partition at spaced points thereon, a first cell case partition dispenser for delivering partitions intermittently to said holder means, a second cell case partition dispenser for delivering partitions intermittently each into a position of crossed assembled relationship with a partition positioned in the holder means by the first said dispenser, said first and second dispensers being located on a common side of the holder means, and a third cell case partition dispenser located on the opposite side of the holder means and for also delivering partitions intermittently each into a position of crossed assembled relationship with a partition positioned in the holder means by the first said dispenser, the third said dispenser being positioned to deliver partitions between the spaced gripping elements of the holder means, and mechanism operating said dispensers in definite timed relation to one another.

4. In a cell case partition assembling machine, partition holder means, said partition holder comprising spaced friction gripping devices adapted to grip a common cell case partition at points spaced on opposite sides of a longitudinal center thereof, a cell case partition dispenser for delivering partitions successively to said holder means, a group of two cell case partition dispensers for collectively delivering successive groups of spaced partitions each into a position of crossed assembled relationship with a group of partitions held by said holder means, the dispensers of said group being positioned and arranged to deliver their respective cell case partitions at opposite sides of the longitudinal center of the partitions retained in said holder means, said cell case dispenser and said group of cell case dispensers being located at the same side of the holder means, another cell case dispenser located on the opposite side of the holder means for also successively delivering cell case partitions each into a position of crossed assembled relationship with a said partition retained in said holder means, the last said dispenser delivering its partitions between the spaced gripping elements of the holder means and substantially at the longitudinal centers of partitions held thereby, and mechanism operating said dispensers and groups of dispensers in definite timed relationship to one another.

5. The structure defined in claim 4 in further combination with independently adjustable mountings for the dispensers of said group thereof allowing independent adjusting movements of said dispensers toward and from one another to vary the spacing between adjacent partitions delivered thereby.

6. In a cell case partition assembling machine, a partition holder for receiving and holding a group of laterally spaced partitions during a subsequent assembly operation, a first group of spaced dispensers for collectively delivering a succession of groups of laterally spaced partitions to the holder means, a second group of spaced partition dispensers collectively delivering a succession of groups of spaced partitions each into a position of crossed assembled relationship with a group of partitions retained by the holder means, a single partition dispenser for successively delivering partitions each into a position of crossed assembled relationship with a said group of partitions retained by said partition holder, said groups of partition dispensers being located on a common side of the partition holder and said single partition dispenser being located on the opposite side of the partition holder, and mechanism operating said group of dispensers and said single dispenser in definite timed relationship each to the others thereof.

7. The structure defined in claim 6 in further combination with adjustable mountings for the dispensers of said groups thereof for varying the spacing between adjacent partitions of common groups delivered thereby.

8. In a cell case partition assembling machine, a conveyor operating between a receiving zone and an assembly zone and having partition holder means for holding a group of cell case partitions in laterally spaced relationship, means operating the conveyor to repeatedly transport the holder means thereof from a receiving zone to the assembly zone, cell case partition dispensing mechanism located at one side of the conveyor and adjacent the receiving zone for delivering laterally spaced groups of partitions to the holder means of the conveyor during periods of presence of the latter in the receiving zone, cell case partition dispensing mechanism located at one side of the conveyor and adjacent the assembly zone for delivering laterally spaced groups of cell case partitions into crossed asssembled relationship with cooperating groups of cell case partitions carried into and positioned in the assembly zone by the holder means of the conveyor, other cell case partition dispensing mechanism also located adjacent the assembly zone but on the side of the conveyor opposite the last said dispensing mechanism for also delivering cell case partitions into positions of crossed assembled relationship with groups of partitions carried into and positioned in the assembly zone by the holder means of the conveyor, and mechanism operating the dispensing mechanisms in definite timed relationship to one another and the conveyor.

9. In a cell case partition assembling machine, a partition holder for receiving and holding a group of partitions in spaced side by side relationship, a parallel group of like partition dispensers each feeding a single partition edgewise into the holder for each of a sequence of operating cycles, mechanism operating said dispensers in timed relation to one another whereby said dispensers will collectively feed partitions to the holder in groups of spaced partitions, and means for imparting unitary adjusting movements to the dispensers of the group thereof toward and from the holder to accommodate the machine to partitions of different depths.

10. In a cell case partition assembling machine, a partition holder for receiving and holding a group of partitions in spaced side by side relationship, a parallel group of like partition dispensers each feeding a single partition edgewise into the holder for each of a sequence of operating cycles, mechanism operating said dispensers in timed relation to one another whereby said dispensers will collectively feed partitions to the holder in groups of spaced partitions, a bed on which the dispensers of said group thereof are mounted, and an adjustable mounting for said bed allowing adjusting movements thereof toward and from the holder to accommodate the machine to partitions of different depths.

11. In a cell case partition assembling machine, partition holder means for receiving and holding groups of spaced cell case partitions fed edgewise thereto, partition stop means cooperating with the partition holder means to limit edgewise movements of the partitions thereinto, a group of cooperating spaced parallel cell case partition dispensers for collectively feeding groups of spaced partitions edgewise to the holder means, the said dispensing mechanisms each feeding a single partition to the holder means for each of a sequence of operations, mechanism operating the dispensers of the group in definite timed relation, adjustable mountings for the dispensers of said group allowing adjusting movements of adjacent dispensers toward and from one another to vary the spacing between adjacent partitions of groups delivered thereby to the holder means, the dispensers of said group thereof being spaced from the stop means, and means for adjustably varying the spacing between the said group of dispensers and said stop means for the purpose of accommodating partitions of different depths.

12. The structure defined in claim 11 in which the said dispensers each comprise a cell case partition magazine and a cooperating conveyor feeding partitions therefrom to the holder means and wherein the conveyor portions of said dispensers extend in parallel relation to one another.

13. In a cell case partition assembling machine, a group of spaced friction-type partition holders for receiving and holding a group of partitions fed edgewise thereto, each holder of the group being adapted to hold a single partition at a given time, means mounting adjacent holders of the group for movements toward and from one another, partition stop means cooperating with the partition holders to limit edgewise movements of partitions thereinto, a group of spaced cell case partition dispensing mechanisms for intermittently feeding groups of spaced partitions edgewise to the group of holders, each of said dispensing mechanisms feeding a single partition to a different one of said holders during a given operating cycle, another dispensing mechanism for feeding partitions edgewise intermittently each into crossed assembled relationship with a group of partitions held by the said group of holders, said stop means serving as a base of reaction for the group of partitions held by said holders during the assembly of partitions thereon by the last said dispensing mechanism, mechanism operating the dispensing mechanism of said group thereof and said other dispensing mechanism in definite timed relationship, means mounting adjacent dispensers of said group thereof for adjusting movements toward and from one another to vary the spacing between adjacent partitions fed thereby to the holders to compensate for variations in spacing between adjacent holders of the group, and means for adjustably varying the spacing between said stop means and the several said dispensers to accommodate partitions of different depths.

14. The structure defined in claim 13 in which said dispensers of said group thereof each comprise a magazine portion and a conveyor portion, the conveyor portions of adjacent dispensers of the group thereof being arranged in spaced parallel relationship, and in which the dispensers of said group are mounted for independent adjusting movements toward and from one another on a common support.

15. In a cell case partition assembling machine, partition holder means adapted for receiving and holding a group of spaced partitions fed edgewise thereto, a group of cell case partition dispensers for collectively feeding groups of spaced partitions intermittently to the holder means, the dispensers of said group having spaced parallel conveyor portions, mechanism operating the dispensers of said group in timed relation to one another, a bed on which the dispensers of said group are mounted for relative movements toward and from one another to vary the spacing between adjacent partitions fed thereby to the holder means, and adjustable mountings for said bed allowing adjustable movements thereof and the dispensers of said group as a unit toward and from the holder means to accommodate partitions of different depths.

16. The structure defined in claim 8 in which the said conveyor is a journalled turret-like structure and in which the partition holder means thereof is located in radially-spaced relation to the conveyor axis where it will move in an arcuate path between the receiving zone and the assembly zone.

17. In a cell case partition assembling machine, a group of spaced partition holders each adapted to receive and hold a single cell case partition, independently adjustable mountings for a plurality of said holders to permit variable spacing of adjacent holders of the group, a group of spaced cooperating cell case partition dispensers each for cooperative alignment with and delivery of partitions singularly to a different one of said holders, independently adjustable mountings for a plurality of said dispensers whereby to vary the spacing between adjacent dispensers of the group thereof to compensate for corresponding variations in spacing between adjacent holders of the group of holders, a second group of spaced cooperating cell case partition dispensers collectively delivering groups of spaced cell case partitions each into a position of crossed assembled relationship with a group of partitions held by said holders and previously delivered to the group of holders by the first-said group of dispensers, and mechanism operating the dispensers of each group in predetermined timed relation to one another and the dispensers of the other group thereof.

18. In a cell case partition assembling machine, a conveyor operating between a receiving zone and an assembly zone and having partition holder means for holding a group of sidewise spaced cell case partitions, a group of spaced cell case partition dispensing mechanisms collectively delivering a group of sidewise spaced cell case partitions to the holder means of said conveyor during a period of presence of the latter in the receiving zone, and a group of spaced cell case partition dispensing mechanisms collectively delivering a group of sidewise spaced cell case partitions into crossed assembled relationship with a group of cell case partitions carried into and positioned in the assembly zone by the said holder means of the conveyor, said conveyor being a journalled structure and wherein the partition holder means thereof moves in an arcuate path between the receiving zone and the assembly zone.

19. In a cell case partition assembling machine, a conveyor operating between the receiving zone and the assembly zone and having partition holder means for holding a group of cell case partitions in laterally spaced parallel relationship, cell case partition dispensing mechanism simultaneously delivering a group of laterally spaced parallel cell case partitions to the holder means of said conveyor during a period of presence of the latter in the receiving zone, and cell case partition dispensing mechanism simultaneously delivering a group of laterally spaced parallel cell case partitions into crossed assembled relationship with a group of cell case partitions carried into and positioned in the assembly zone by the holder means of the conveyor, said conveyor being a journalled turret-like structure and in which the partition holder means thereof is located in radially-spaced relation to the conveyor axis where it will move in an arcuate path between the receiving zone and the assembly zone.

20. In a cell case partition assembling machine, a conveyor, partition holder means carried by the conveyor and adapted to hold a group of spaced cell case partitions in laterally-spaced relationship, mechanism operating the conveyor to repeatedly move its holder means from a receiving position in a receiving zone to an assembly position in an assembly zone, a group of spaced cell case partition dispensing mechanisms located adjacent the receiving zone and collectively delivering a group of laterally spaced cell case partitions to the holder means of the conveyor during intervals when the latter is in its receiving position in the receiving zone, the said movement imparted by the conveyor holder means including bodily angular movement resulting in angular disposition of a group of partitions held thereby in assembly positions in the assembly zone with respect to their previous receiving positions in the receiving zone, and a group of spaced cell case partition dispensing mechanisms located adjacent the assembly zone and collectively delivering groups of laterally spaced partitions into crossed assembled relationship with groups of laterally spaced partitions carried into and positioned in the assembly zone by the holder means of the conveyor, mechanisms operating the dispensing mechanisms in definite timed relationship to the conveyor, and means for adjustably varying the spacing between individual dispensing mechanisms of the first and second mentioned groups thereof to thereby vary the spacing between adjacent partitions of partition groups respectively delivered thereby to the receiving and assembly zones.

21. In a cell case partition assembling machine, a conveyor, a group of spaced partition holders carried by the conveyor, mechanism operating the conveyor to repeatedly move the group of holders from a receiving position in a receiving zone to an assembly position in an assembly zone, a group of spaced cell case partition dispensing mechanisms located adjacent to the receiving zone and collectively delivering a group of laterally spaced cell case partitions to the group of holders of the conveyor during intervals when said group of holders is in its receiving position in the receiving zone, the said movement imparted to said group of holders by said conveyor including bodily angularity movement of the several holders of the group resulting in angular disposition of the group of partitions held thereby in assembly positions in the assembly zone with respect to their previous receiving positions in the receiving zone, and a group of spaced cell case partition dispensing mechanisms located adjacent the assembly zone and collectively delivering groups of laterally spaced partitions into positions of crossed assembled relationship with groups of spaced partitions carried into and positioned in the assembly zone by the holders of the conveyor, mechanism operating said dispensing mechanisms in definite timed relationship to said conveyor, means mounting the partition holders of the conveyor for adjusting movements toward and from one another to vary the lateral spacing between partitions of a group carried thereby, and means mounting the individual dispensing mechanisms of each of said groups thereof for lateral adjusting movements one with respect to the other.

22. In a cell case partition assembling machine, a conveyor, partition holder means carried by the conveyor and adapted to hold a group of spaced cell case partitions in laterally spaced relationship, mechanism operating the conveyor to repeatedly move its holder means from a receiving position in a receiving zone to an assembly position in an assembly zone, a group of spaced cell case partition dispensing mechanisms located adjacent the receiving zone and collectively delivering a group of laterally spaced cell case partitions to the holder means of the conveyor during intervals when the latter is in its receiving position in the receiving zone, the said movement imparted by the conveyor holder means including bodily angular movement resulting in angular disposition of a group of partitions held thereby in assembly positions in the assembly zone with respect to their previous receiving positions in the receiving zone, and a group of spaced cell case partition dispensing mechanisms located adjacent the assembly zone and collectively delivering groups of laterally spaced partitions into crossed assembled relationship with groups of laterally spaced partitions carried into and positioned in the assembly zone by the holder means of the conveyor, mechanisms operating the dispensing mechanism in definite timed relationship to the conveyor, and adjustable mountings for the individual dispensing mechanisms of the first said group thereof for varying the spacing between adjacent dispensing mechanisms of said group thereof and partitions delivered thereby to the holders in the receiving zone.

23. In a cell case partition assembling machine, a conveyor, partition holder means carried by the conveyor and adapted to hold a group of spaced cell case partitions in laterally spaced relationship, mechanism operating the conveyor to repeatedly move its holder means from a receiving position in a receiving zone to an assembly position in an assembly zone, a group of spaced cell case partition dispensing mechanisms located adjacent the receiving zone and collectively delivering a group of laterally spaced cell case partitions to the holder means of the conveyor during intervals when the latter is in its receiving position in the receiving zone, the said movement imparted by the conveyor holder means including bodily angular movement resulting in angular disposition of a group of partitions held thereby in assembly positions in the assembly zone with respect to their previous receiving positions in the receiving zone, and a group of spaced cell case partition dispensing mechanisms located adjacent the assembly zone and collectively delivering groups of laterally spaced partitions into crossed assembled relationship with groups of laterally spaced partitions carried into and positioned in the assembly zone by the holder means of the conveyor, mechanisms operating the dispensing mechanisms in definite timed relationship to the conveyor, and adjustable mountings for the individual dispensing mechanisms of the first and second groups thereof for varying the spacing between adjacent dispensing mechanisms of said groups and adjacent partitions of partition groups respectively delivered thereby to the receiving and assembly zones.

24. In a cell case partition assembling machine, a conveyor, a group of spaced partition holders carried by the conveyor, mechanism operating the conveyor to repeatedly move the group of holders from a receiving position in a receiving zone to an assembly position in an assembly zone, a group of spaced cell case partition dispensing mechanisms located adjacent to the receiving zone and collectively delivering a group of laterally spaced cell case partitions to the group of holders of the conveyor during intervals when said group of holders is in its receiving position in the receiving zone, the said movement imparted to said group of holders by said conveyor including bodily angularity movement of the several holders of the group resulting in angular disposition of the group of partitions held thereby in assembly positions in the assembly zone with respect to their previous receiving positions in the receiving zone, and a group of spaced cell case partition dispensing mechanisms located adjacent the assembly zone and collectively delivering groups of laterally spaced partitions into positions of crossed assembled relationship with groups of spaced partitions carried into and positioned in the assembly zone by the holders of the conveyor, mechanism operating said dispensing mechanisms in definite timed relationship to said conveyor, adjustable mountings for the partition holders of the conveyor for varying the spacing between adjacent holders and between partitions of a group of holders carried thereby, and adjustable mount partitions carried thereby, and adjustable mountings for the individual dispensing mechanisms of the first group thereof for varying the spacing between adjacent mechanisms of the group and adjacent partitions of groups of partitions delivered thereby.

25. In a cell case partition assembling machine, a conveyor, a group of spaced partition holders carried by the conveyor, mechanism operating the conveyor to repeatedly move the group of holders from a receiving position in a receiving zone to an assembly position in an assembly zone, a group of spaced cell case partition dispensing mechanisms located adjacent to the receiving zone and collectively delivering a group of laterally spaced cell case partitions to the group of holders of the conveyor during intervals when said group of holders is in its receiving position in the receiving zone, the said movement imparted to said group of holders by said conveyor including bodily angularity movement of the several holders of the group resulting in angular disposition of the group of partitions held thereby in assembly positions in the assembly zone with respect to their previous receiving positions in the receiving zone, and a group of spaced cell case partition dispensing mechanisms located adjacent the assembly zone and collectively delivering groups of laterally spaced partitions into positions of cross assembled relationship with groups of spaced partitions carried into and positioned in the assembly zone by the holders of the conveyor, mechanism operating said dispensing mechanisms in definite timed relationship to said conveyor, adjustable mountings for the partition holders of the conveyor for varying the spacing between adjacent of said holders and between partitions of a group of partitions carried thereby, and adjustable mountings for the individual dispensing mechanisms of each of said groups thereof.

26. In a cell case partition assembling machine, a conveyor operating between a receiving zone and an assembly zone and having partition holder means for holding successive groups of spaced cell case partitions in side by side relationship during their passage from the receiving zone to the assembly zone and while in the assembly zone, a group of spaced cell case partition dispensing mechanisms collectively delivering a group of sidewise spaced cell case partitions to the holder means of said conveyor during a period of presence of the latter in the receiving zone, a group of spaced cell case partition dispensing mechanisms collectively delivering a group of sidewise spaced cell case partitions into crossed assembled relationship with a group of cell case partitions carried into and positioned in the assembly zone by the said holder means of the conveyor, and means mounting adjacent dispensing mechanisms of the first said group thereof for relative adjusting movements one with respect to the other to vary the sidewise spacing between adjacent partitions of the group of partitions collectively delivered thereby to the holder means of said conveyor, said conveyor being a journalled structure wherein the partition holder means thereof moves in an arcuate path between the receiving zone and the assembly zone.

27. In a cell case partition assembling machine, a conveyor operating between a receiving zone and an assembly zone and having partition holder means for holding successive groups or cell case partitions in spaced side by side relationship during their passage from the receiving zone to the assembly zone and while in the assembly zone, a group of spaced cell case partition dispensing mechanisms collectively delivering a group of sidewise spaced cell case partitions to the holder means of said conveyor during a period of presence of the latter in the receiving zone, a group of spaced cell case partition dispensing mechanisms collectively delivering a group of sidewise spaced cell case partitions into crossed assembled relationship with a group of cell case partitions carried into and positioned in the assembly zone by the said holder means of the conveyor, means for variably spacing the dispensing mechanisms of each of said groups thereof to thereby vary the spacing between adjacent partitions of common groups delivered respectively to the receiving and assembly zones, said conveyor being a journalled structure wherein the partition holder means thereof moves in an arcuate path between the receiving zone and the assembly zone.

28. In a cell case partition assembling machine, a conveyor operating between a receiving zone and an assembly zone, a group of spaced partition holders relatively adjustably mounted on the conveyor for variable spacing thereof and a group of sidewise spaced partitions carried thereby, means operating said conveyor to repeatedly transport said holders from the receiving zone to the assembly zone, a group of spaced cell case partition dispensing mechanisms for collectively delivering groups of sidewise spaced cell case partitions to the holder means of said conveyor during periods of presence of the latter in the receiving zone, another group of spaced cell case partition dispensing mechanisms for collectively delivering groups of sidewise spaced cell case partitions into positions of crossed assembled relationship with cooperating groups of partitions carried into and positioned in the assembly zone by the holders of said conveyor, means for adjustably varying the spacing between dispensing mechanisms of each of said groups thereof, mechanism operating the dispensing mechanisms in definite timed relation to the conveyor, said conveyor being a journalled structure wherein the group of partition holders thereof moves in an arcuate path concentric with the axis of the conveyor between the receiving zone and the assembly zone.

29. In a cell case partition assembling machine, a conveyor for operation between a receiving zone and an assembly zone, a group of spaced partition holders relatively adjustably mounted on the conveyor for variable spacing thereof and a group of partitions carried thereby, means operating said conveyor to repeatedly transport said holders from the receiving zone to the assembly zone, a group of spaced cell case partition dispensing mechanisms for collectively delivering common groups of spaced cell case partitions to the holder means of said conveyor each during a period of presence of the holder means in the receiving zone, another group of spaced cell case partition dispensing mechanisms for collectively delivering common groups of spaced cell case partitions each into a position of crossed assembled relationship with a cooperating group of partitions carried into and positioned in the assembly zone by the holders of said conveyor, means for adjustably varying the spacing between the dispensing mechanisms of the first said group thereof to thereby produce cooperative alignment between each of a plurality of dispensing mechanisms of said group and a cooperating conveyor holder in different adjusted positions of the conveyor holders, mechanism operating said partition dispensing mechanisms in definite timed relationship to one another and said conveyor, said conveyor being a journalled structure wherein the group of partition holders thereof moves in an arcuate path concentric with the axis of the conveyor between the receiving zone and the assembly zone.

30. In a machine for assembling cell case cores from slotted cell case partitions, a group of spaced partition holders each adapted to receive and hold a single slotted cell case partition, independently adjustable mountings for a plurality of said holders to permit variable spacing of adjacent holders of the group, a first group of spaced cooperating cell case partition dispensers each for cooperative alignment with and delivering correspondingly slotted partitions singularly to a different one of said holders, the dispensers of the first group thereof being arranged in laterally spaced parallel relationship with their transverse centers in alignment and delivering partitions to the holders in laterally spaced parallel relationship with corresponding slots in alignment, independently adjustable mountings for a plurality of the dispensers of the first group thereof whereby to vary the spacing between adjacent dispensers of the group thereof to compensate for corresponding variations in the spacing between adjacent holders of the group of holders, a second group of spaced cooperating cell case partition dispensers each for cooperative alignment with and delivery of partitions singularly to different aligned slots of groups of partitions held by said holders and previously delivered to the group of holders by the first said group of dispensers, independently adjustable mountings for a plurality of the dispensers of the second group of dispensers whereby to vary the spacing between dispensers of the second group thereof to compensate for different spacings of the slots in the partitions held by the holders, and mechanism for operating the dispensers of each group thereof in predetermined timed relation to one another and the dispensers of the other group thereof.

31. In a machine for assembling cell case cores from slotted cell case partitions, partition holder means receiving and holding successive groups of laterally-spaced slotted cell case partitions, a first group of spaced cooperating cell case partition dispensers collectively delivering groups of spaced correspondingly slotted cell case partitions to the holder means, the dispensers of the first group thereof being arranged in laterally spaced and parallel relationship with their transverse centers in alignment and delivering partitions to the holder means in laterally spaced parallel relationship with corresponding slots in alignment, independently adjustable mountings for a plurality of the dispensers of the first group of dispensers whereby to vary the spacing between adjacent dispensers of the group thereof and the partitions of the partition groups delivered thereby to the holder means, said partition holder means including elements for receiving and holding groups of partitions as delivered thereto by the first group of dispensers in all adjusted positions of the said first group of dispensers, a second group of spaced cooperating cell case partition dispensers each for cooperative alignment with and delivery of partitions singularly to different aligned slots of the groups of partitions held by the holder means and previously delivered to the holder means by the first said group of dispensers, independently adjustable mountings for a plurality of dispensers of the second group of dispensers whereby to vary the spacing between dispensers of the second group thereof to compensate for different spacings of the slots in the partitions held by the holders, and mechanism for operating the dispensers of each group thereof in predetermined timed relation to one another and the dispensers of the other group thereof.

32. In a machine for assembling cell case cores from slotted cell case partitions, a journalled turret-like conveyor, a group of spaced partition holders carried by the turret-like conveyor and disposed in radially-spaced relation to the axis of the conveyor so as to move in an arcuate path under rotation of the conveyor, mechanism operating the conveyor to repeatedly transport said group of holders between a receiving zone and an assembly zone spaced approximately 90 degrees from the receiving zone, independently adjustable mountings for a plurality of said holders to permit variable spacing of the adjacent holders of the group, a first group of spaced cooperating cell case partition dispensers located adjacent the receiving zone and each for cooperative alignment with and delivery of correspondingly slotted partitions singularly to a different one of said holders, the dispensers of the first group thereof being arranged in laterally-spaced parallel relationship with their transverse centers in alignment and delivering partitions to the holders in laterally-spaced parallel relationship with the corresponding slots in alignment, independently adjustable mountings for a plurality of said dispensers of the first group thereof whereby to vary the spacing between adjacent dispensers of the group to compensate for corresponding variations in spacing between adjacent holders of the said group of holders, a second group of cooperating cell case partition dispensers located adjacent the assembly zone and each for cooperative alignment with and delivery of partitions singularly to different aligned slots of groups of partitions held by the holders and previously delivered to the group of holders by the first said group of dispensers, independently adjustable mountings for a plurality of the dispensers of the second group of dispensers whereby to vary the spacing between dispensers of the second group thereof to compensate for different spacings of the slots in the partitions held by the holders, and mechanism operating the dispensers of each group thereof in predetermined timed relationship to one another and the dispensers of the other group thereof and the turret-like conveyor.

GEORGE G. PORTER.

References Cited in the file of this patent

UNITED STATES PATENTS

| Number | Name | Date |
|---|---|---|
| 303,935 | Jaeger | Aug. 19, 1884 |
| 659,010 | Williams | Oct. 2, 1900 |
| 1,643,357 | Wade et al. | Sept. 27, 1927 |
| 1,682,878 | Willi | Sept. 4, 1928 |
| 2,353,842 | McLaughlin | July 18, 1944 |
| 2,355,461 | Nichols | Aug. 8, 1944 |
| 2,414,336 | Shields | Jan. 14, 1947 |